(12) United States Patent
Kim et al.

(10) Patent No.: US 10,642,183 B2
(45) Date of Patent: May 5, 2020

(54) IMAGE FORMING APPARATUS AND LIGHT EMITTING DEVICE

(71) Applicant: HEWLETT-PACKARD DEVELOPMENT COMPANY, L.P., Spring, TX (US)

(72) Inventors: Wan Chin Kim, Suwon (KR); Wan Ho Lee, Suwon (KR); Kyoung Man Kim, Suwon (KR); Su Hwan Kim, Suwon (KR); Yong Shik Park, Suwon (KR); Sang Koo Han, Suwon (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 15/981,422

(22) Filed: May 16, 2018

(65) Prior Publication Data

US 2019/0064693 A1  Feb. 28, 2019

Related U.S. Application Data

(63) Continuation of application No. PCT/KR2016/012175, filed on Oct. 27, 2016.

(30) Foreign Application Priority Data

Nov. 18, 2015 (KR) .................. 10-2015-0161683

(51) Int. Cl.
  *G03G 15/04* (2006.01)
  *B41J 2/45* (2006.01)
  *G02B 5/08* (2006.01)

(52) U.S. Cl.
  CPC ......... *G03G 15/04054* (2013.01); *B41J 2/451* (2013.01); *G02B 5/0875* (2013.01); *G03G 2215/0409* (2013.01)

(58) Field of Classification Search
  CPC ................ G02B 26/123; G02B 5/0875; G03G 15/0435; G03G 15/04054; B41J 2/473; B41J 2/45; H01S 5/18358; H01S 5/3434
  See application file for complete search history.

(56) References Cited

U.S. PATENT DOCUMENTS 5,337,074 A * 8/1994 Thornton .................. B41J 2/45
   257/E27.121
5,682,402 A * 10/1997 Nakayama .......... H01L 51/5012
   372/39

(Continued)

FOREIGN PATENT DOCUMENTS

EP    2346123 A2   7/2011

*Primary Examiner* — John Zimmermann
(74) *Attorney, Agent, or Firm* — Staas & Halsey LLP

(57) ABSTRACT

An image forming device comprises: an exposer having a plurality of light emitting devices, a light emitting device among the plurality of light emitting devices to transmit light toward a photosensitive drum; and a developer to develop an electrostatic latent image formed on a surface of the photosensitive drum by the light, wherein the light emitting device among the plurality of light emitting devices includes: a light emitting layer to generate the light; and a reflective layer to reflect at least a portion of the generated light. The reflective layer can include a plurality of sub-reflective layers, in which a thickness of a sub-reflective layer among the plurality of sub-reflective layers is different from a thickness of another sub-reflective layer among the plurality of sub-reflective layers, and/or a refractive index of a sub-reflective layer among the plurality of sub-reflective layers is different from a refractive index of another sub-reflective layer among the plurality of sub-reflective layers.

20 Claims, 31 Drawing Sheets

(56) References Cited

U.S. PATENT DOCUMENTS

| | | | |
|---|---|---|---|
| 6,538,682 B2 * | 3/2003 | Ohkubo | G03B 27/52 347/238 |
| 8,208,511 B2 | 6/2012 | Sato et al. | |
| 2002/0135664 A1 * | 9/2002 | Mashimo | B41J 2/4476 347/238 |
| 2005/0231800 A1 * | 10/2005 | Lippey | G02B 5/0875 359/443 |
| 2007/0280322 A1 * | 12/2007 | Sato | B82Y 20/00 372/50.11 |
| 2008/0024849 A1 * | 1/2008 | Hayashi | B82Y 20/00 359/204.1 |
| 2008/0055672 A1 * | 3/2008 | Watanabe | G03G 15/326 358/474 |
| 2008/0267663 A1 | 10/2008 | Ichii et al. | |
| 2009/0295902 A1 * | 12/2009 | Sato | B82Y 20/00 347/224 |
| 2010/0214633 A1 | 8/2010 | Sato et al. | |
| 2012/0107003 A1 | 5/2012 | Hasegawa | |
| 2013/0222869 A1 | 8/2013 | Maeda et al. | |
| 2014/0130975 A1 | 5/2014 | Shouji et al. | |
| 2015/0153628 A1 * | 6/2015 | Cho | B82Y 20/00 356/601 |

* cited by examiner

[FIG. 11]
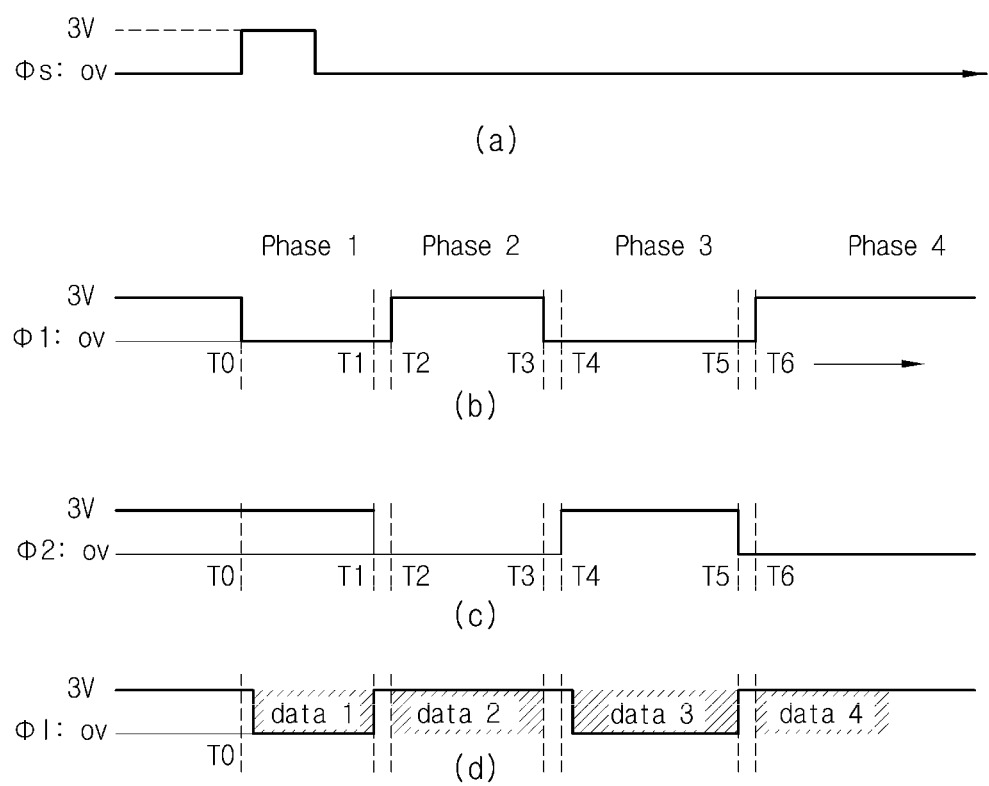

【FIG. 12】
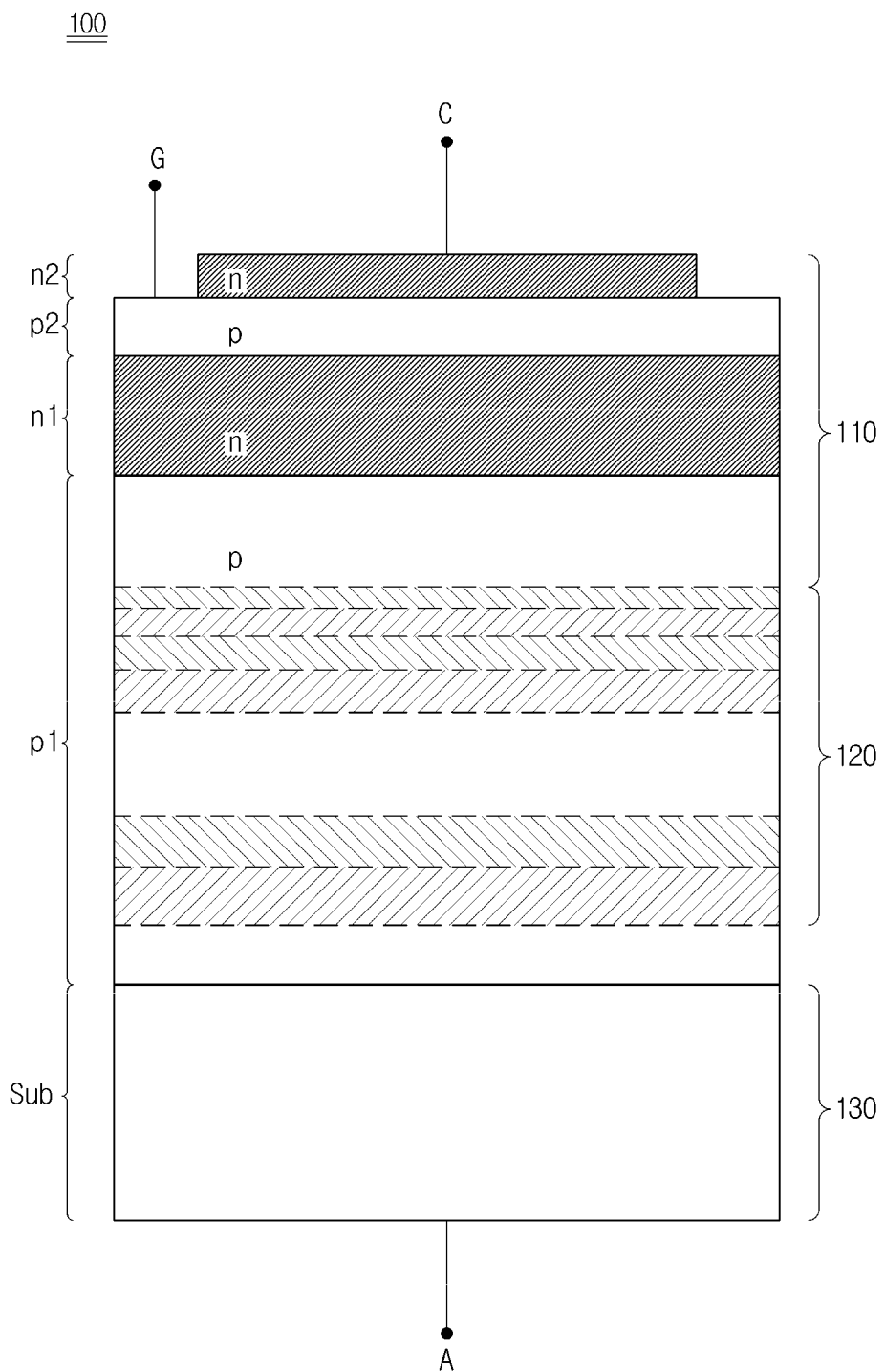

【FIG. 13】
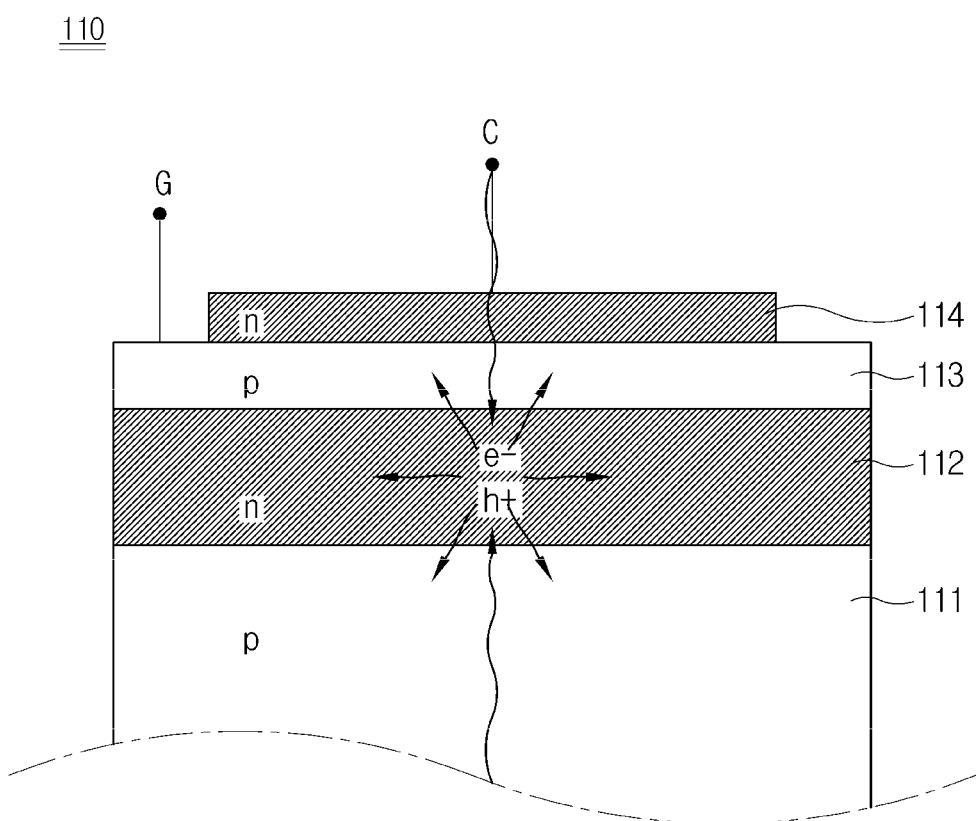

【FIG. 14】
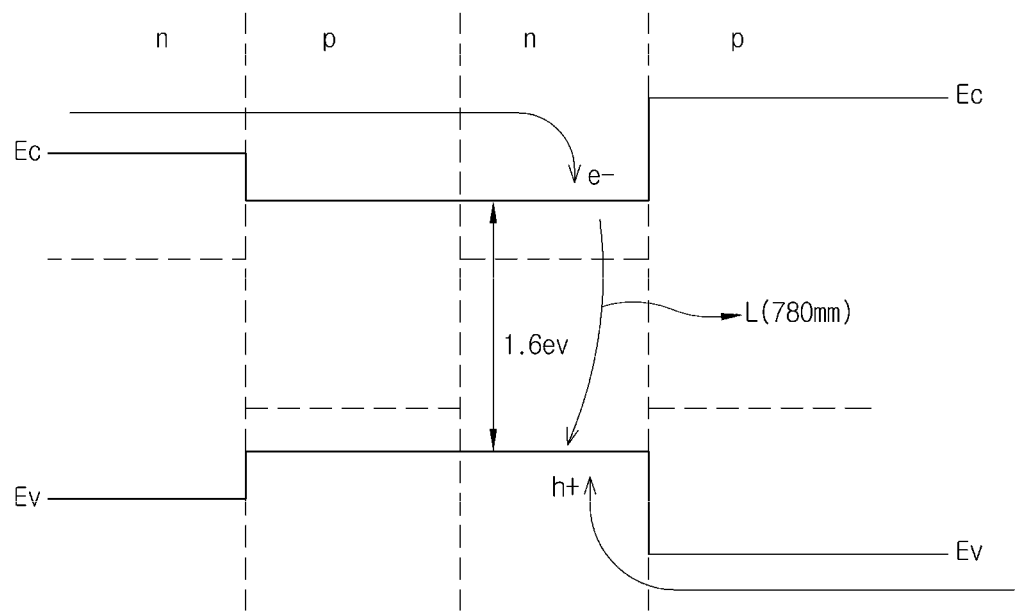

【FIG. 15】
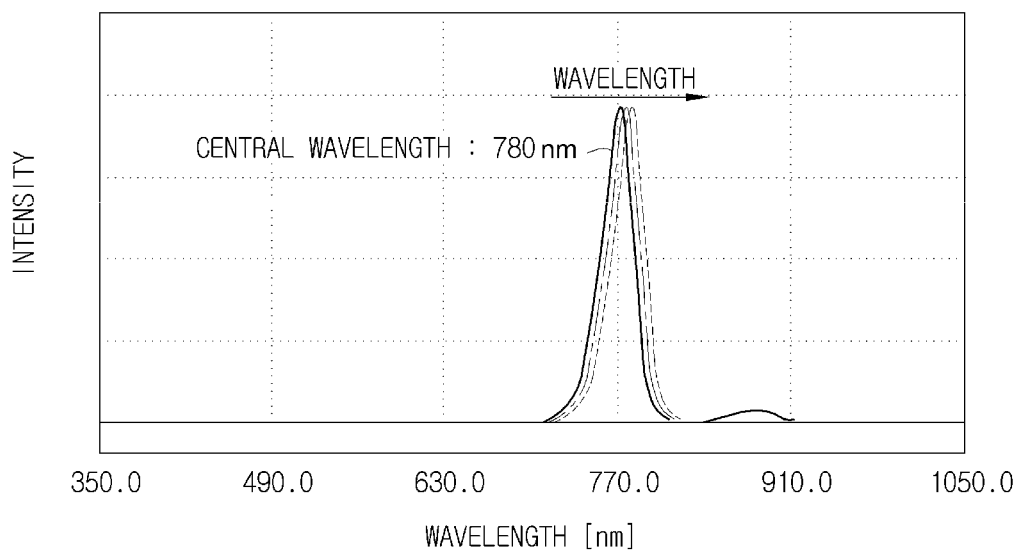

【FIG. 16】
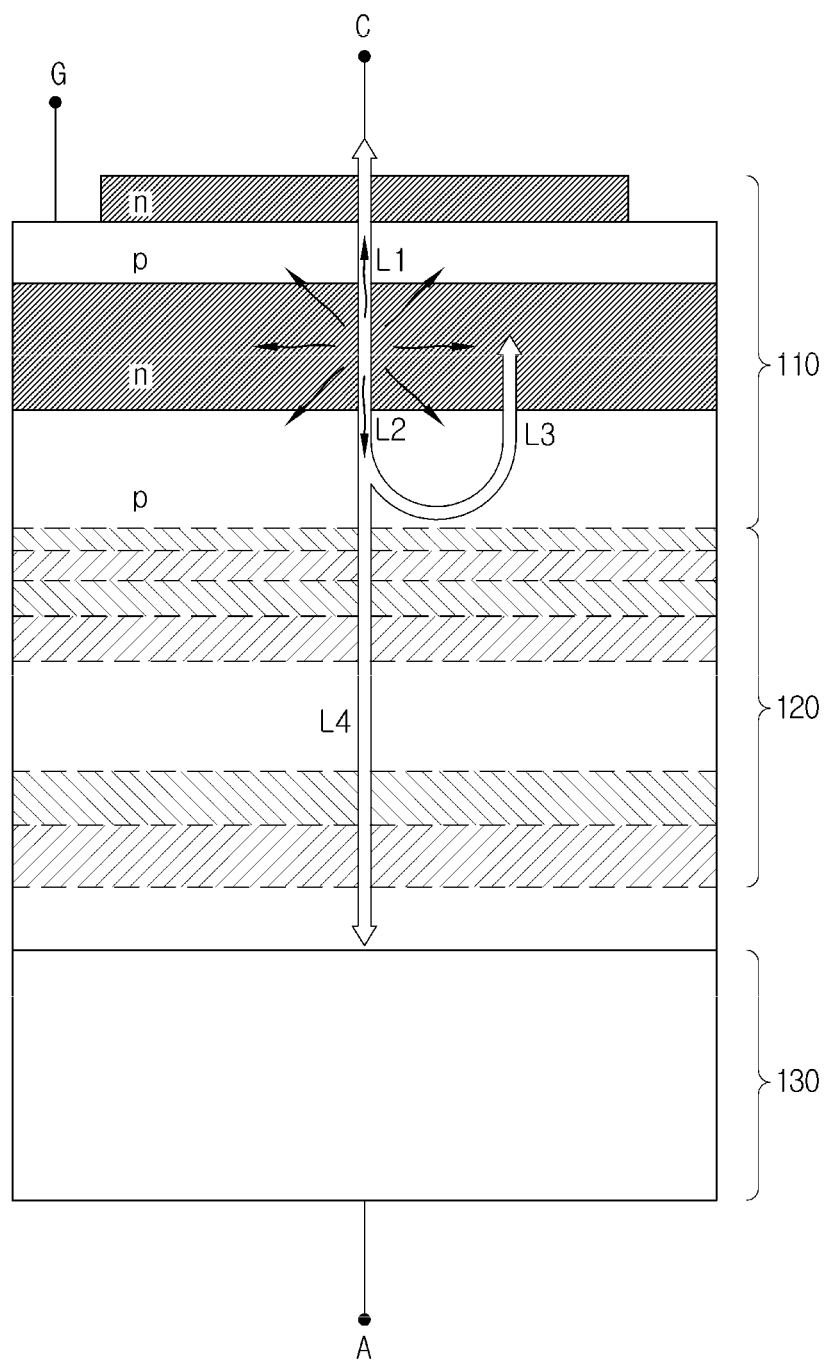

[FIG. 17]
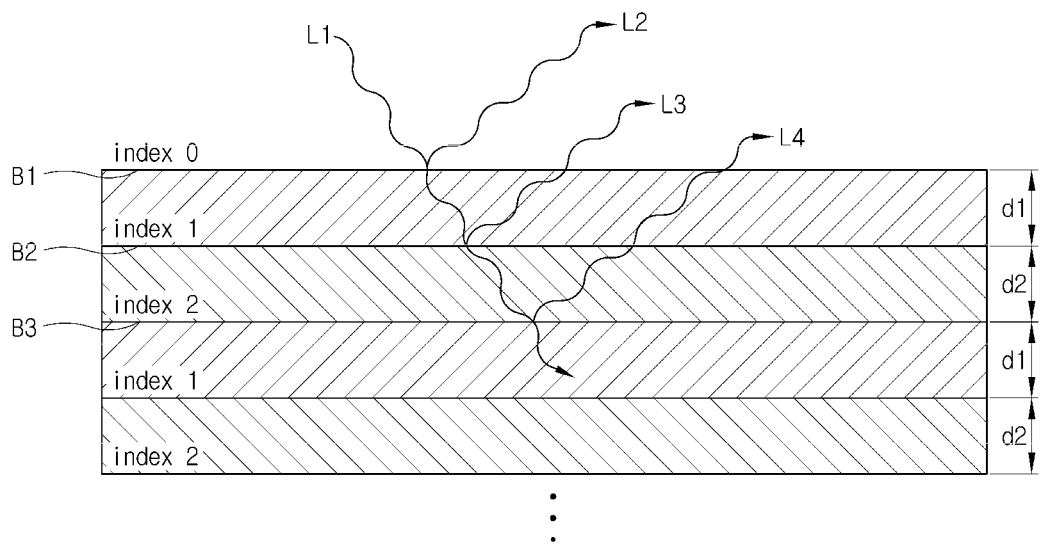

[FIG. 18]
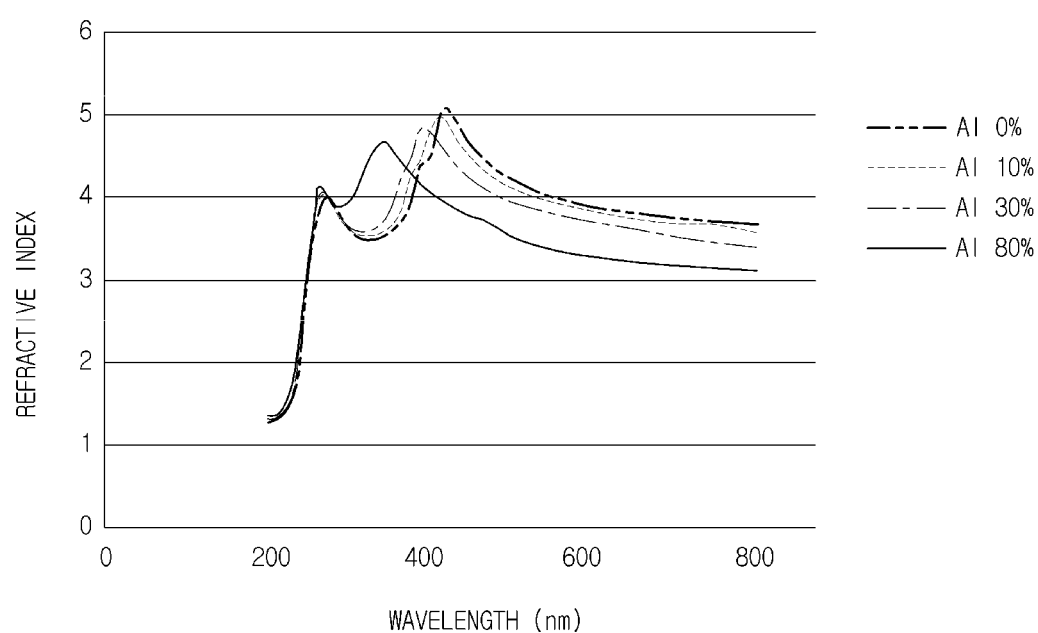

[FIG. 19]
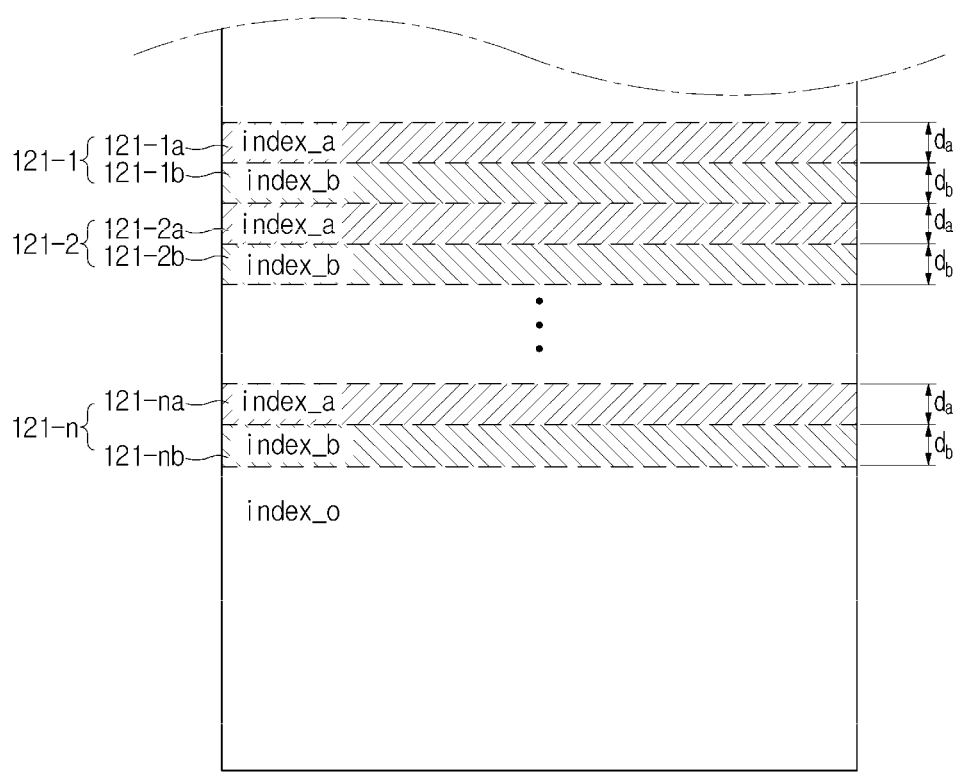

[FIG. 20]
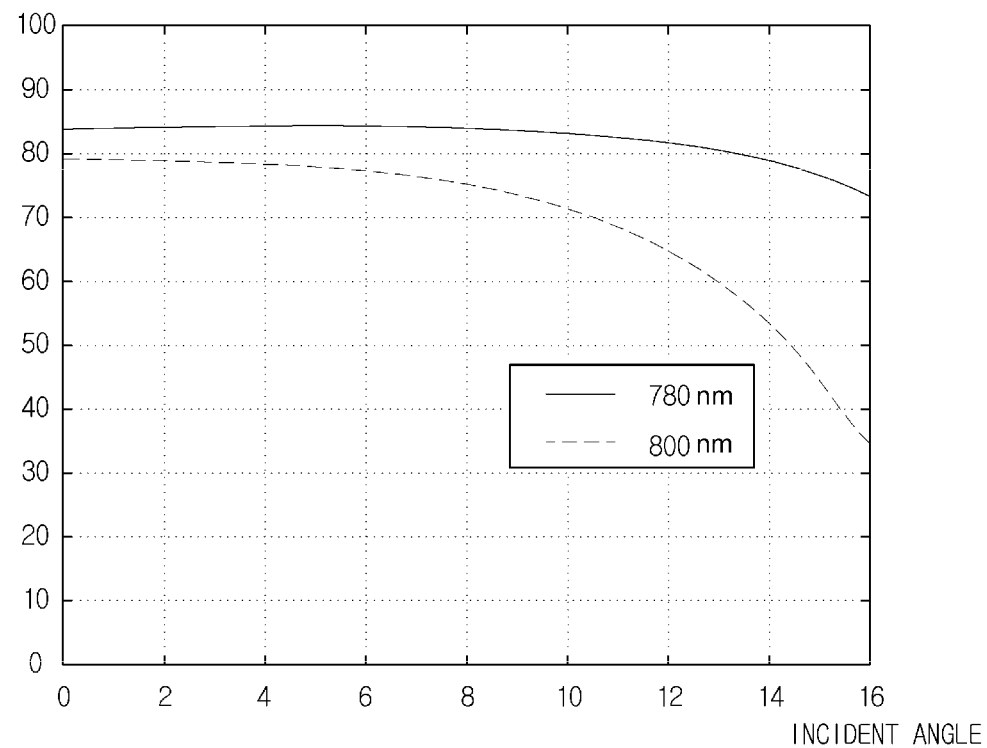

[FIG. 21]
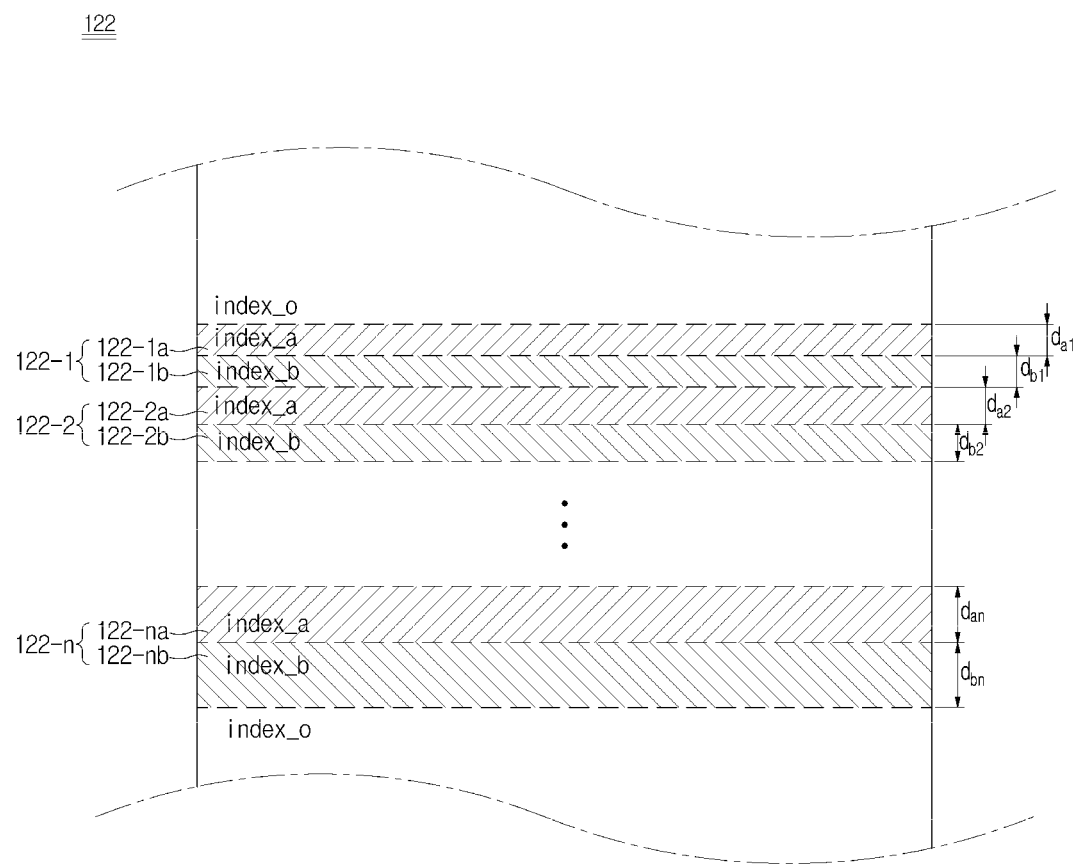

[FIG. 22]
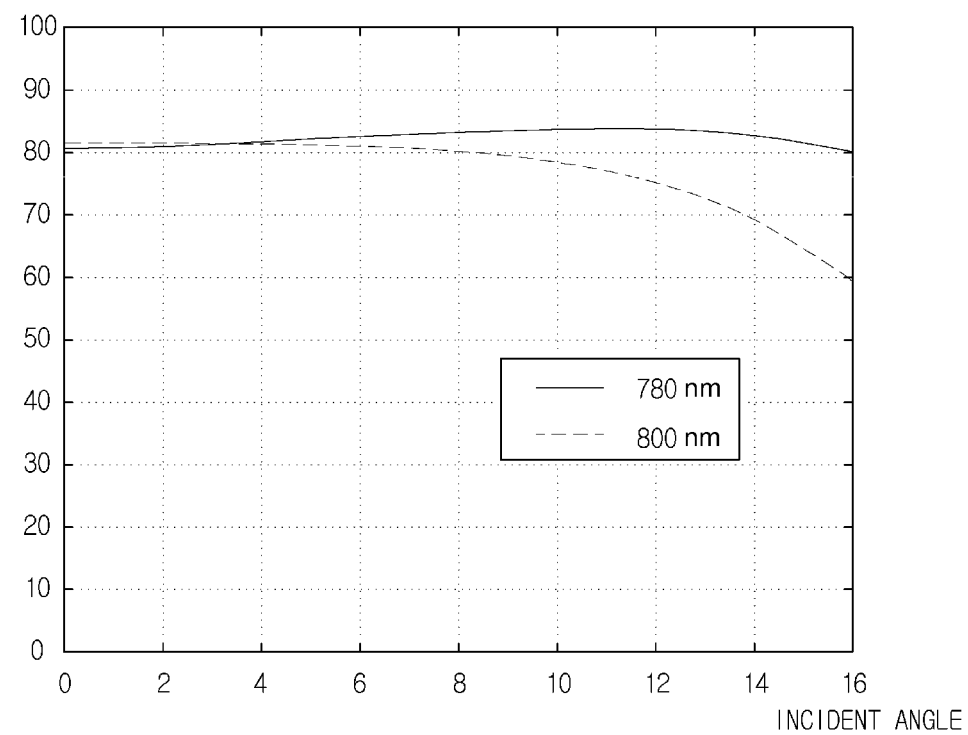

[FIG. 23]
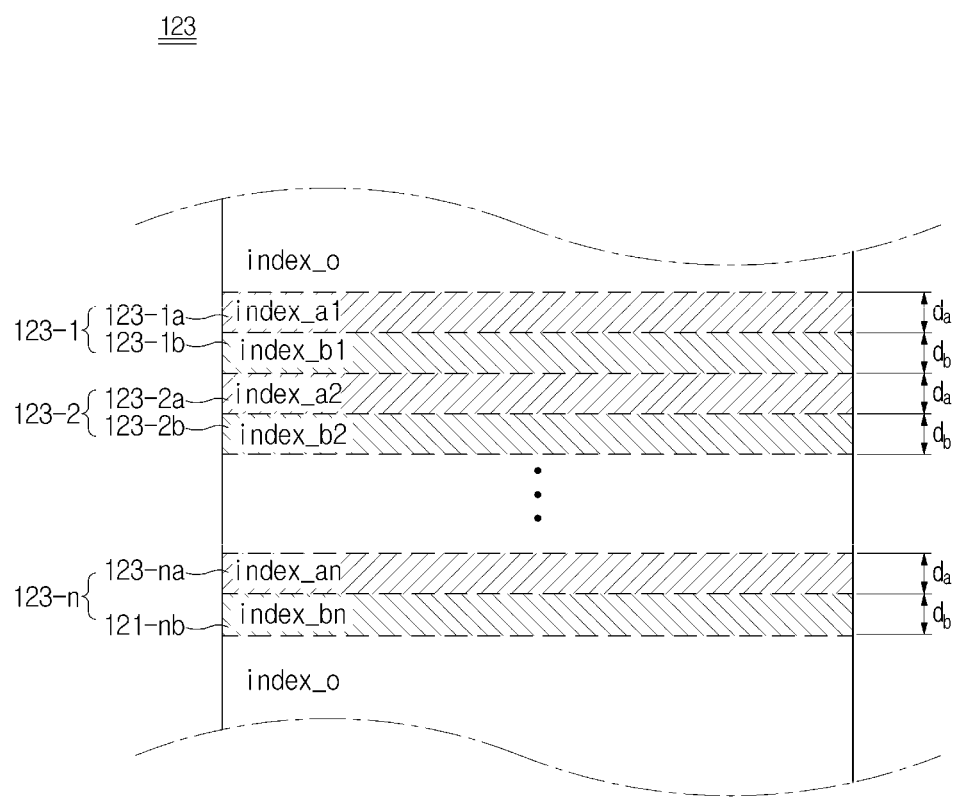

[FIG. 24]
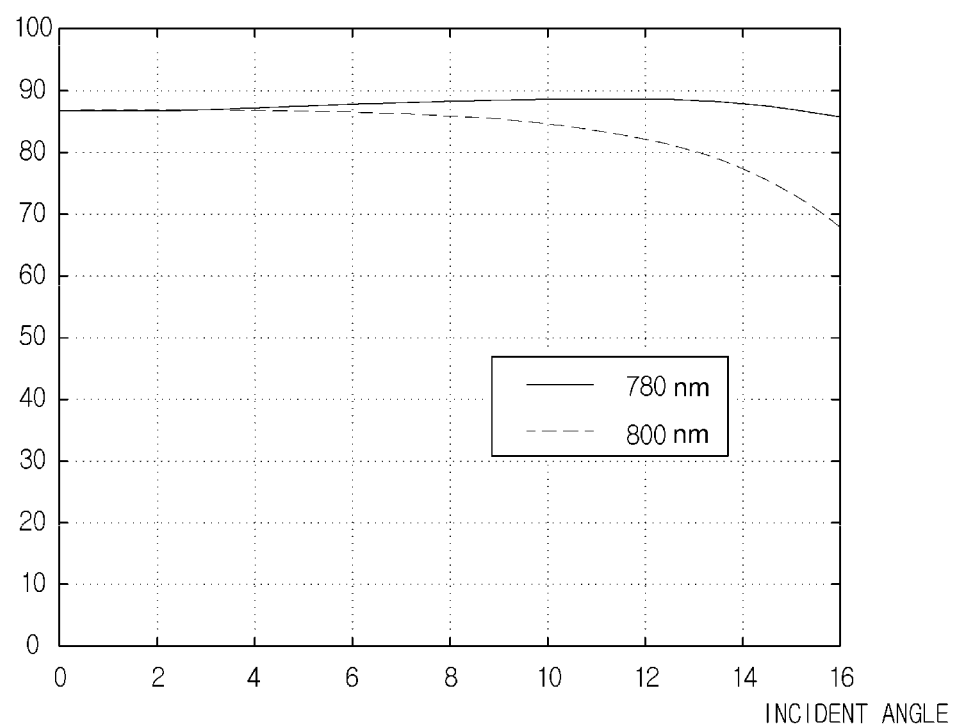

[FIG. 25]
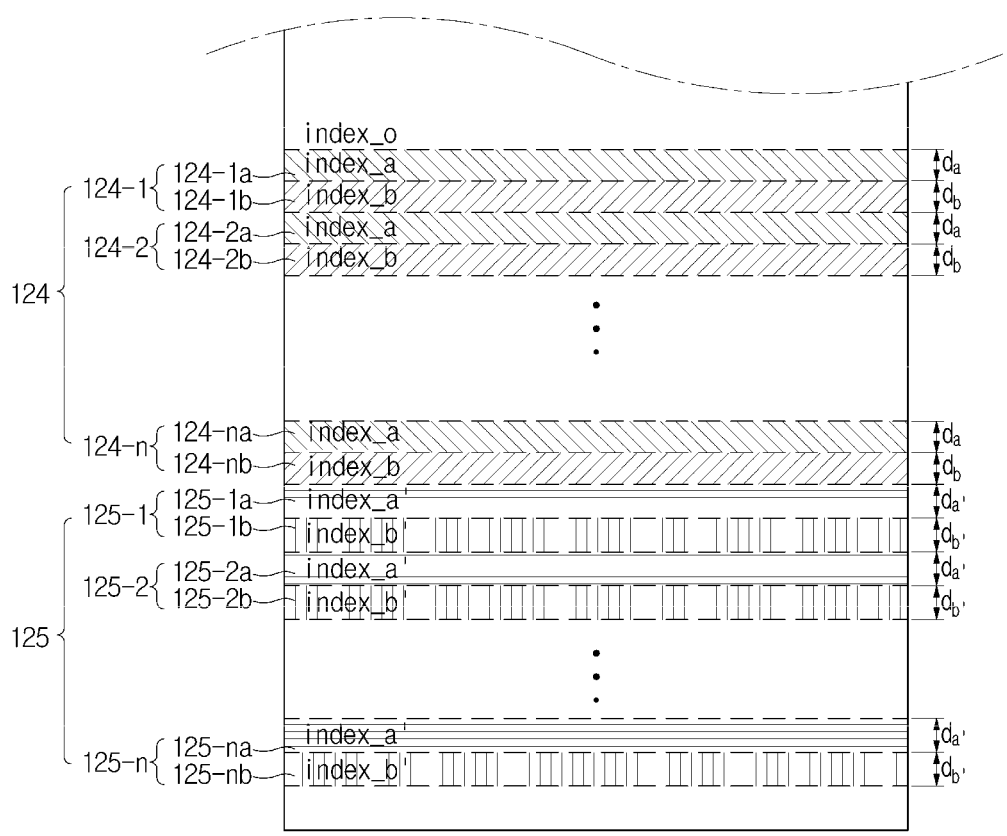

[FIG. 26]
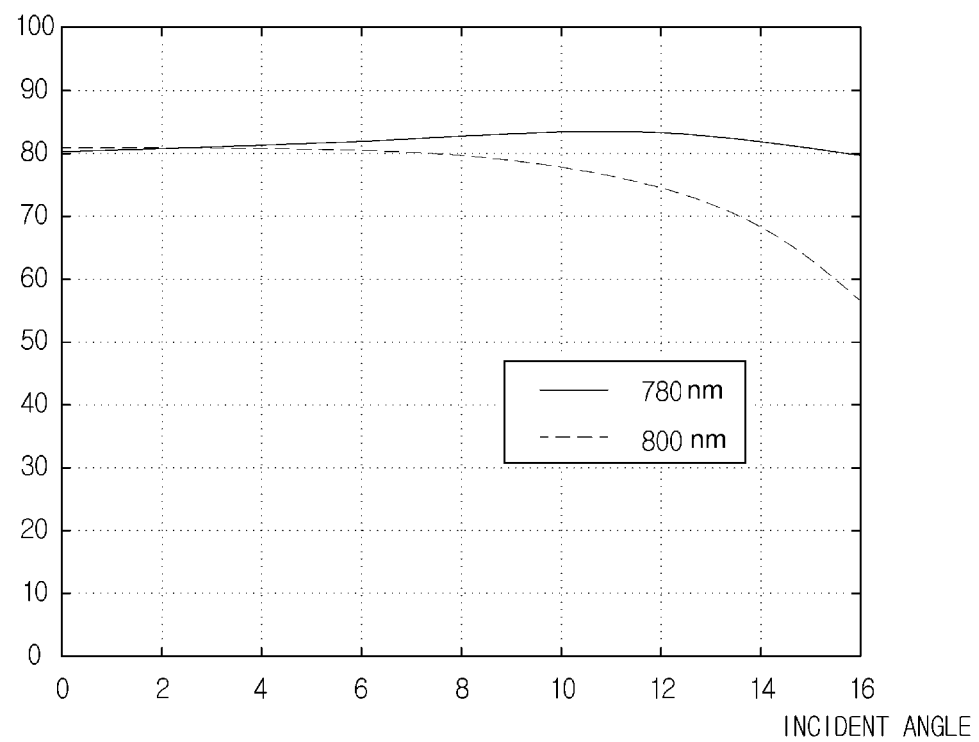

[FIG. 27]
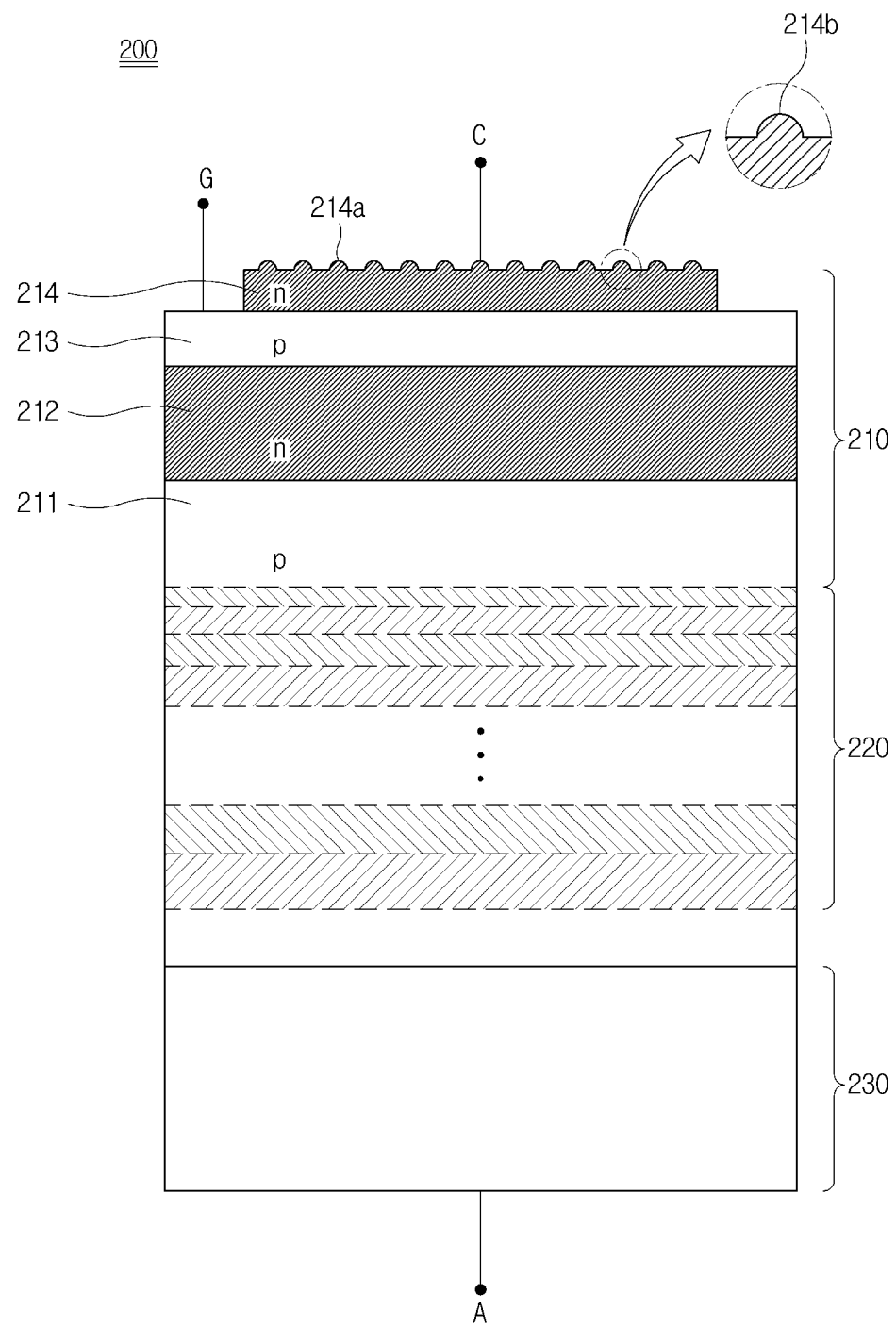

[FIG. 28]
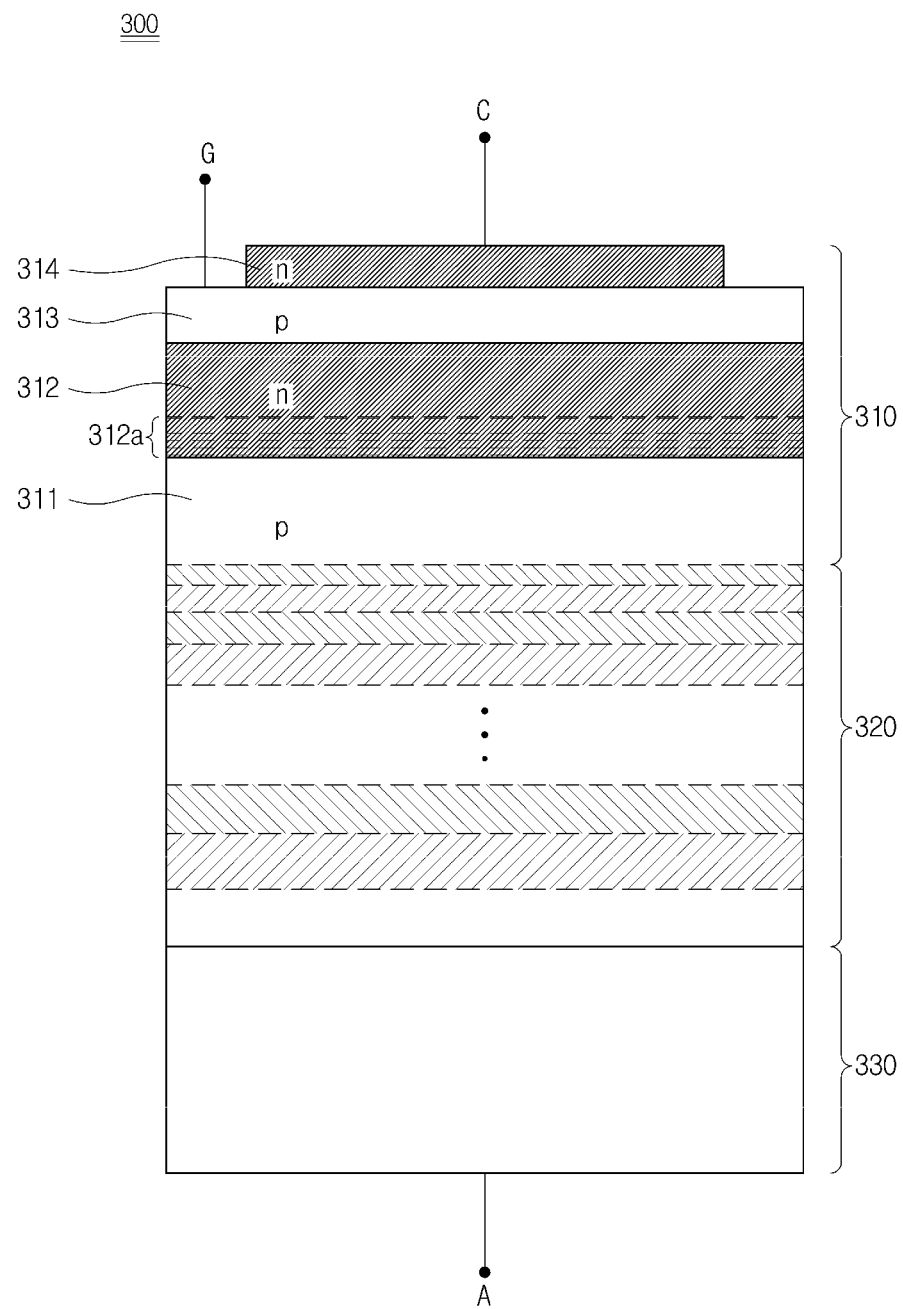

[FIG. 29]
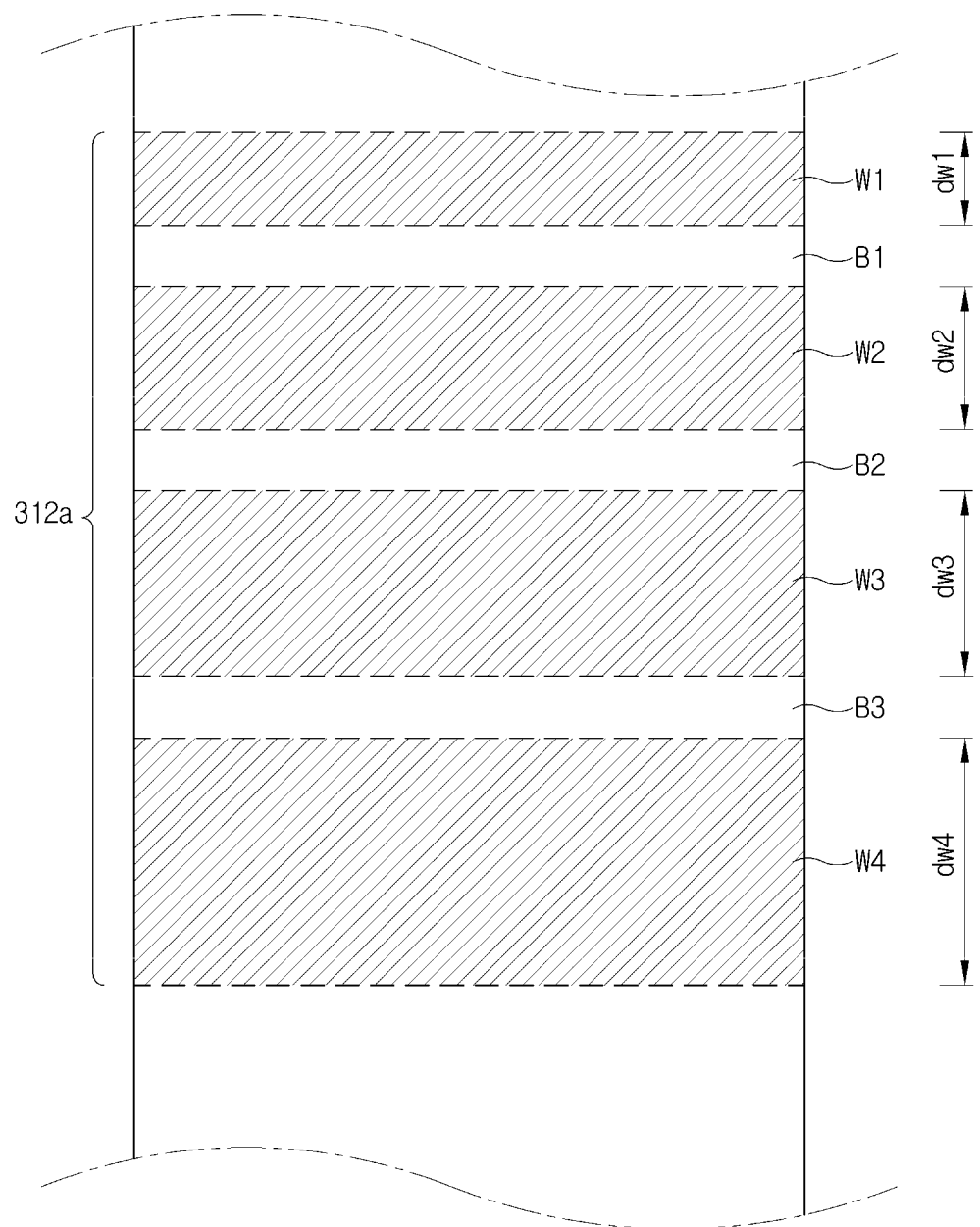

[FIG. 30]
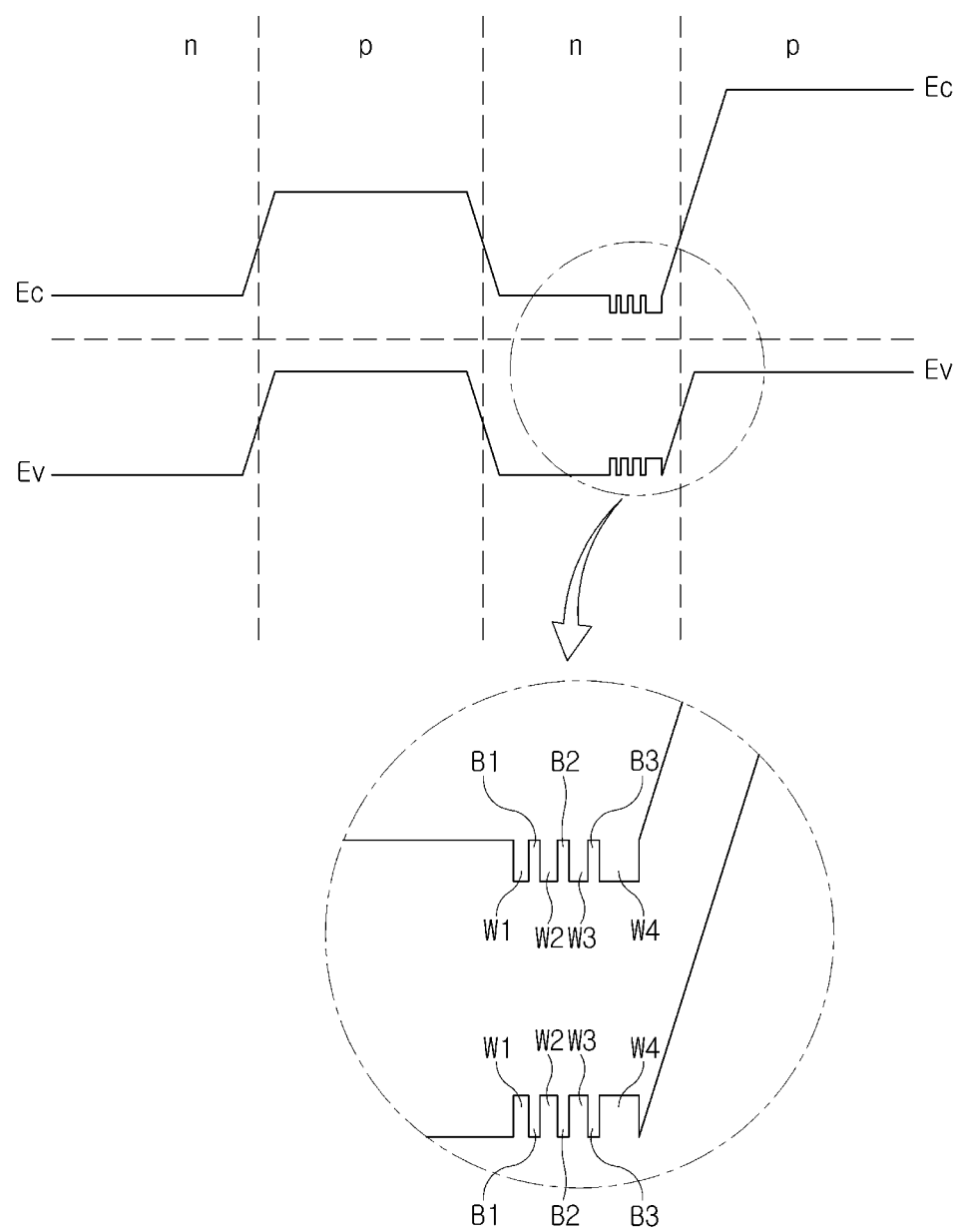

[FIG. 31]
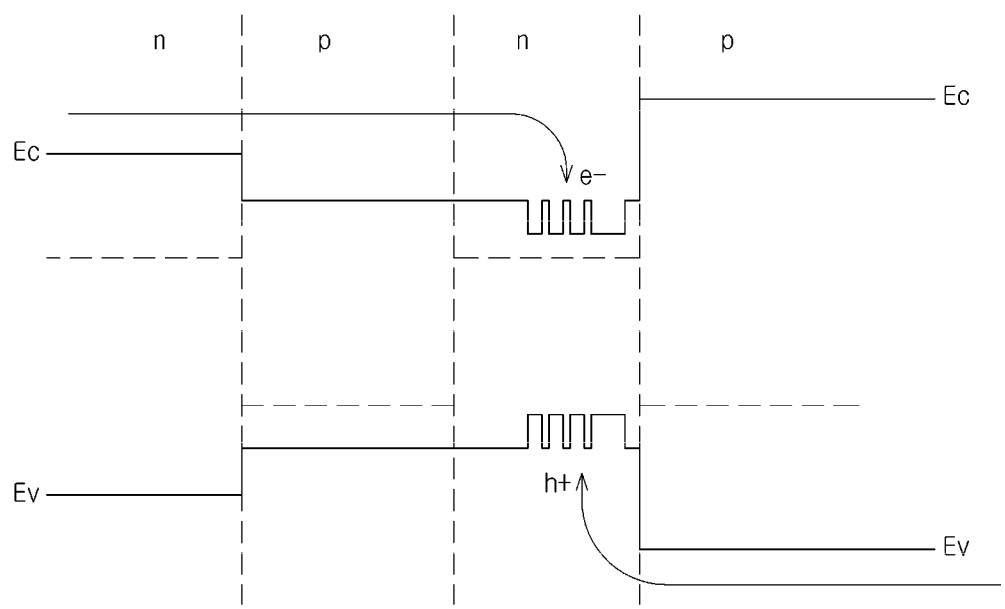

IMAGE FORMING APPARATUS AND LIGHT EMITTING DEVICE

CROSS-REFERENCE TO RELATED APPLICATIONS

This application is a continuation application of PCT international patent application no. PCT/KR2016/012175, filed on Oct. 27, 2016, which claims priority from Korean Patent Application No. 10-2015-0161683, filed on Nov. 18, 2015 in the Korean Intellectual Property Office, the content of each of the foregoing is incorporated herein by reference.

BACKGROUND

Generally, an image forming apparatus such as a printer, a copying machine, and a facsimile irradiates a charged photosensitive drum with image information using an exposure module, generates an electrostatic latent image, and uses a toner to develop the electrostatic latent image. Then, the image forming apparatus may transfer and settle a toner image on a printing medium and form an image on the printing medium.

As the exposure module used in the above case, a laser scanning unit (LSU) that uses laser to scan a laser beam in a scanning direction has been widely used.

In recent years, research on a light emitting diode (LED) print head (LPH), in which a plurality of LEDs are arranged in a scanning direction and the plurality of LEDs sequentially generate light, has been carried out to reduce the size of the exposure module.

DESCRIPTION OF DRAWINGS

FIG. 11 illustrates control signals and image data of the PH according to an example.

FIG. 12 illustrates a side cross-sectional view of a light emitting device according to an example.

FIG. 13 illustrates a light emitting layer of the light emitting device according to an example.

FIG. 14 illustrates an energy band diagram of the light emitting device according to an example.

FIG. 15 illustrates a spectrum of light transmitted from the light emitting device according to an example.

FIG. 16 illustrates light emission and light reflection of the light emitting device according to an example.

FIG. 17 illustrates light reflection by a Bragg reflector.

FIG. 18 illustrates a refractive index of light in accordance with a percentage of Al in an AlGaAs semiconductor.

FIG. 19 illustrates an example of a reflective layer included in the light emitting device according to an example.

FIG. 20 illustrates a reflectivity of the reflective layer illustrated in FIG. 19.

FIG. 21 illustrates another example of a reflective layer included in a light emitting device according to an example.

FIG. 22 illustrates a reflectivity of the reflective layer illustrated in FIG. 21.

FIG. 23 illustrates still another example of a reflective layer included in a light emitting device according to an example.

FIG. 24 illustrates a reflectivity of the reflective layer illustrated in FIG. 23.

FIG. 25 illustrates yet another example of a reflective layer included in a light emitting device according to an example.

FIG. 26 illustrates a reflectivity of the reflective layer illustrated in FIG. 25.

FIG. 27 illustrates a side cross-sectional view of a light emitting device according to another example.

FIG. 28 illustrates a side cross-sectional view of a light emitting device according to still another example.

FIG. 29 illustrates an enlarged view of a light emitting layer of the light emitting device according to still another example.

FIGS. 30 and 31 illustrate energy band diagrams of the light emitting layer of the light emitting device according to still another example.

DETAILED DESCRIPTION

Figure 1:
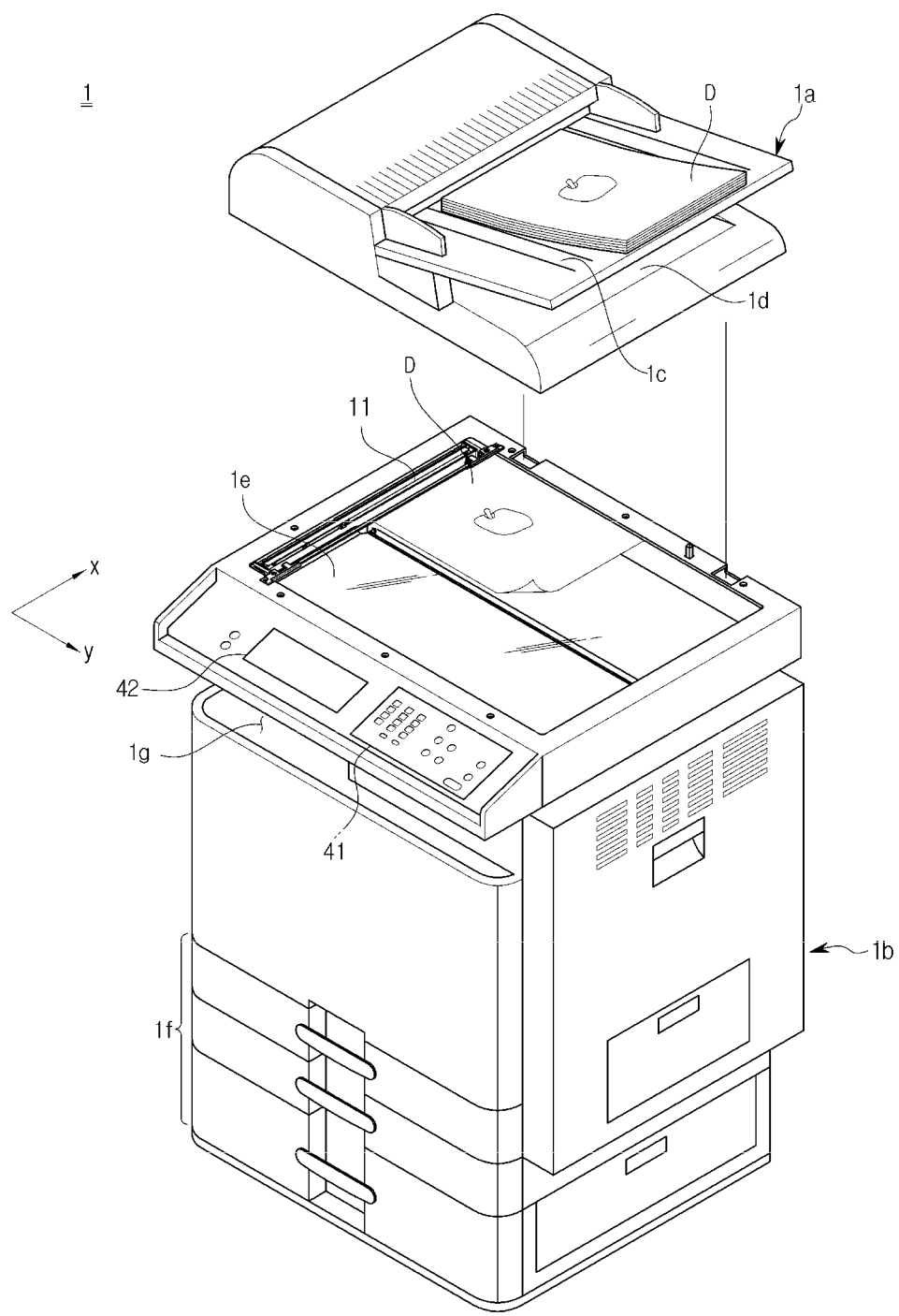
FIG. 1 illustrates an exterior of an image forming apparatus according to an example.

However, such an LPH has a property in that an intensity of generated light is lower in comparison to that of the LSU.

It is an example aspect of the present disclosure to provide a light emitting device capable of preventing light from being absorbed by a substrate, and an image forming apparatus including the same.

It is an example aspect of the present disclosure to provide a light emitting device capable of preventing light from being absorbed by a substrate regardless of an increase of temperature of the light emitting device, and an image forming apparatus including the same.

It is an example aspect of the present disclosure to provide a light emitting device capable of improving light generation efficiency and an image forming apparatus including the same.

It is an example aspect of the present disclosure to provide a light emitting device capable of improving light extraction efficiency and an image forming apparatus including the same.

According to an example aspect of the present disclosure, a light emitting device capable of preventing light from being absorbed by a substrate, and an image forming apparatus including the same can be provided.

According to an example aspect of the present disclosure, a light emitting device capable of preventing light from being absorbed by a substrate regardless of an increase of temperature of the light emitting device, and an image forming apparatus including the same can be provided.

According to an example aspect of the present disclosure, a light emitting device capable of improving light generation efficiency and an image forming apparatus including the same can be provided.

According to an example aspect of the present disclosure, a light emitting device capable of improving light extraction efficiency and an image forming apparatus including the same can be provided.

Examples described herein and configurations illustrated in the drawings are examples, and various modifications which may replace the examples and the drawings herein may be present at the time of filing this application.

Terms used herein are for describing examples and are not intended to limit and/or restrict the disclosure.

Specifically, in the application, a singular expression includes a plural expression unless context clearly indicates otherwise.

In the application, terms such as "include" or "have" are to designate that features, number, steps, operations, elements, parts, or combinations thereof exist and do not preclude the existence of or the possibility of adding other feature(s), number(s), step(s), operation(s), element(s), part(s), or combination(s) thereof in advance.

In the application, terms including ordinals such as "first" and "second" may be used to describe various elements, but the elements are not limited by the terms. The terms are only used for the purpose of distinguishing one element from another element.

In the application, terms such as "part," "-er/or," "block," "member," and "module" may refer to units of processing at least one function or operation. For example, the terms may refer to hardware such as a field-programmable gate array (FPGA)/application specific integrated circuit (ASIC), machine readable instructions stored in a memory, or process(es) processed by a processor.

Hereinafter, an example of the present disclosure will be described in detail with reference to the accompanying drawings. Like reference numerals or symbols shown in the accompanying drawings may indicate components or elements that perform substantially the same function.

Figure 2:
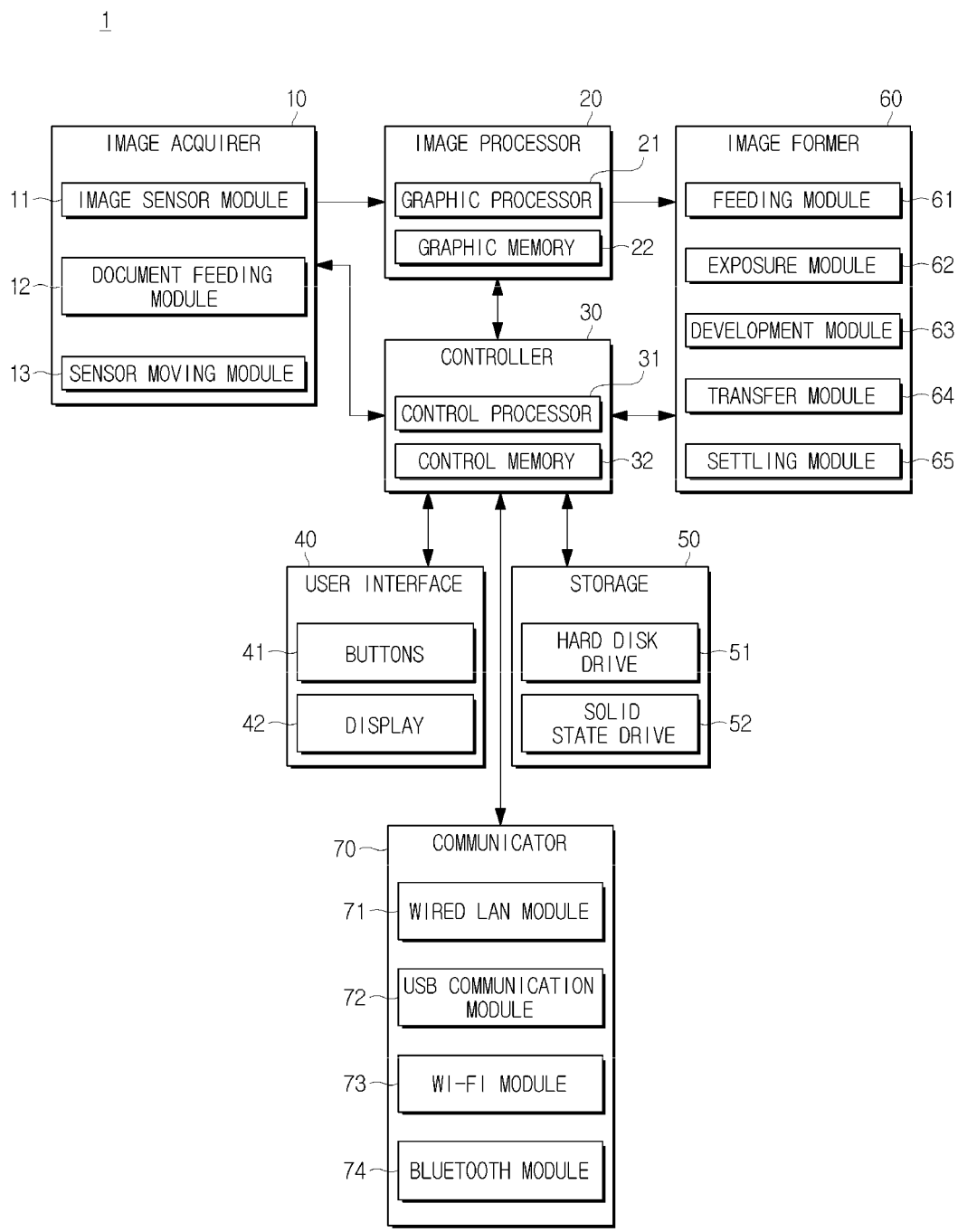
FIG. 2 illustrates a configuration of the image forming apparatus according to an example.
Figure 3:
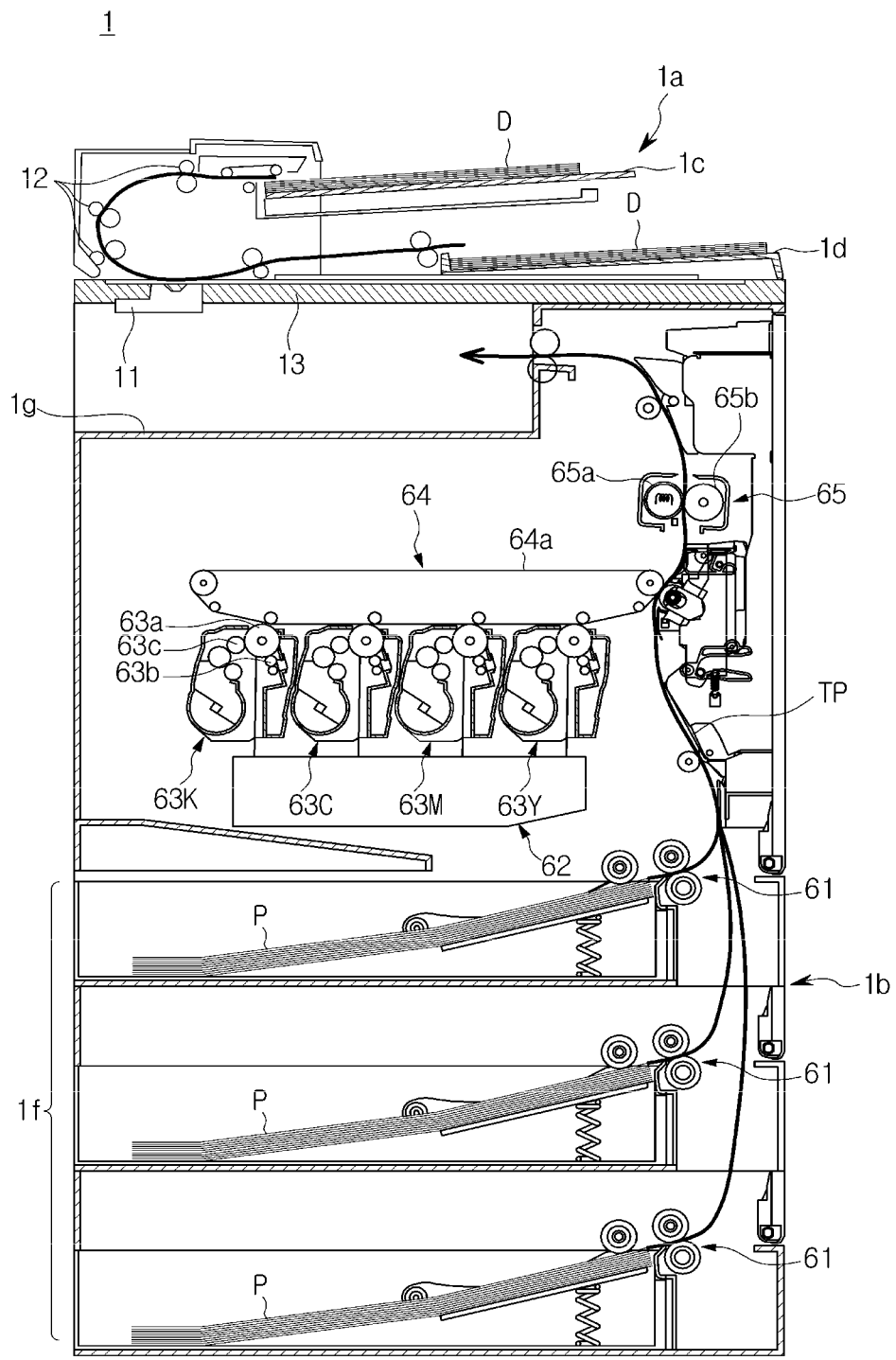
FIG. 3 illustrates a side cross-sectional view of the image forming apparatus according to an example.

FIG. 1 illustrates an exterior of an image forming apparatus according to an example. FIG. 2 illustrates a configuration of the image forming apparatus according to an example. FIG. 3 illustrates a side cross-sectional view of the image forming apparatus according to an example.

An image forming apparatus 1 may acquire an image formed on a surface of a document D and form the acquired image on a printing medium P. Here, the document D refers to a piece of paper, film, cloth or the like having an image such as text, a picture, or the like formed on a surface thereof, and the printing medium P refers to a piece of paper, film, cloth, or the like having a surface on which the image such as text, a picture, or the like may be formed.

An example of the image forming apparatus 1 includes a printer that prints an image received through communication on a printing medium P. However, the image forming apparatus 1 is not limited to the printer, and may also be a copying machine that acquires an image formed on a surface of a document D and prints the acquired image on a printing medium P, a scanner that acquires an image formed on a surface of a document D and stores the acquired image, a facsimile that sends an image formed on a surface of a document D through communication or prints an image received through communication, or a multifunction device capable of performing any of the functions of the above-described printer, copying machine, scanner, and facsimile.

A configuration of the image forming apparatus 1 will be described with reference to FIGS. 1, 2, and 3.

As illustrated in FIG. 1, an image forming apparatus 1 may externally include a main body 1b and a flatbed cover 1a configured to cover an upper surface of the main body 1b.

The main body 1b may form an exterior of the image forming apparatus 1 and protect major configurations of the image forming apparatus 1, which will be described below.

A flatbed 1e formed with a transparent material to allow the image forming apparatus 1 to acquire an image formed on a surface of a document D may be provided at the upper surface of the main body 1b, and an image sensor module 11 configured to acquire an image formed on a surface of a document D may be provided below the transparent flatbed 1e. A paper tray 1f configured to store a printing medium P may be provided at a lower portion of the main body 1b, and an output tray 1g from which the printing medium P on which an image is formed is discharged may also be provided.

The flatbed cover 1a may include an automatic document feeder (ADF) configured to shield outside light, with which the flatbed 1e is irradiated, and automatically feed a document D on which an image is formed. The flatbed cover 1a may also include an input tray 1c on which a document D is disposed and an output tray 1d from which a document D, from which an image on a surface thereof is acquired, is discharged.

As illustrated in FIG. 2, the image forming apparatus 1 functionally includes an image acquirer 10, a user interface 40, a storage 50, a communicator 70, an image former 60, an image processor 20, and a controller 30.

The image acquirer 10 may acquire an image formed on a surface of a document D and output image data corresponding to the acquired image.

The image acquirer 10 may include the image sensor module 11 configured to acquire an image formed on a surface of a document D, a document feeding module 12 configured to feed a document D, and a sensor moving module 13 configured to move the image sensor module 11.

The image sensor module 11 may include a linear image sensor for acquiring an image formed on a surface of a document D. In this case, since the linear image sensor may acquire a one-dimensional image, the image forming apparatus 1 may move the image sensor module 11 or feed the document D to acquire a two-dimensional image, which is the image formed on the surface of the document D.

For example, in a case in which a document D is placed on the flatbed 1e, the image forming apparatus 1 may move the image sensor module 11 using the sensor moving module 13 and control the image sensor module 11 to acquire an image on the document D while the image sensor module 11 is being moved.

In a case in which a document D is placed on the input tray 1c of the flatbed cover 1a, the image forming apparatus 1 may move the document D using the document feeding module 12 and control the image sensor module 11 to acquire an image on the document D while the document D is being moved.

The document feeding module 12 may transfer the document D placed on the input tray 1c to the output tray 1d along a feeding path FP to acquire a two-dimensional image on the document D placed on the input tray 1c, and the sensor moving module 13 may move the image sensor module 11 to acquire a two-dimensional image of the document D placed on the flatbed 1e.

The user interface 40 may interact with a user.

For example, the user interface 40 may receive inputs from the user such as color/monochromatic settings for the image forming apparatus 1 to acquire a color/monochromatic image as an image formed on a document D, resolution settings for the image forming apparatus 1 to acquire the image formed on the document D, and the like.

The user interface 40 may display setting values input by the user, an operation state of the image forming apparatus 1, and the like.

Such a user interface 40 may include a plurality of buttons 41 configured to receive predetermined user inputs from the user and a display 42 configured to display various pieces of information.

The storage 50 may store a control program and control data for controlling the image forming apparatus 1 and various application programs and application data for performing various functions in accordance with the user input.

For example, the storage 50 may store an operating system (OS) program for managing configurations and resources (machine readable instructions and hardware) included in the image forming apparatus 1, an image reproducing program for displaying an image on a document D, and the like.

Such a storage 50 may include a nonvolatile memory from which programs or data are not lost, even when power is cut off. For example, the storage 50 may include a hard disk drive 51, a solid state drive 52, or the like.

The communicator 70 transmits and receives data to and from an external device. For example, the communicator 70 may receive image data from a desktop terminal of the user or receive image data from a mobile terminal of the user.

Such a communicator 70 may include a wired local area network (LAN) module 71 configured to connect to a LAN via a wire, a universal serial bus (USB) communication module 72 configured to communicate with the user terminal via a wire, a wireless Fidelity™ (WiFi™) module 73 configured to wirelessly connect to a LAN, and a Bluetooth™ module 74 configured to wirelessly communicate with the user terminal.

The image former 60 may form an image on a printing medium P in accordance with image data. The image former 60 may pick up the printing medium P stored in the paper tray 1*f*, form an image on the picked-up printing medium P, and discharge the printing medium P on which an image is formed to the output tray 1*e*.

Such an image former 60 may include a feeding module 61, an exposure module 62, development modules 63 (63K, 63C, 63M, 63Y), a transfer module 64, and a settling module 65.

The feeding module 61 picks up the printing medium P from the paper tray 1*f* and feeds the picked-up recording medium P to the output tray 1*f* via the transfer module 64 and the settling module 65.

The exposure module 62 transmits light having a pattern corresponding to an image that is acquired by the image acquirer 10 or received through the communicator 70. Such an exposure module 62 may include a light emitting diode (LED) print head (LPH)).

The print head (PH) will be described in detail below.

The development modules 63 form a toner image corresponding to the pattern of the light transmitted from the exposure module 62. Such a development module 62 may include a photosensitive drum 63*a* on which an electrostatic latent image is formed by the light transmitted from the exposure module 62, a charging roller 63*b* configured to charge the photosensitive drum 63*a* for the electrostatic latent image to be formed thereon, and a developing roller 63*c* configured to develop the electrostatic latent image formed on the photosensitive drum 63*c* by using a toner.

While the photosensitive drum 63*a* is rotated, the toner image is formed by a charging operation, an exposing operation, and a developing operation. Specifically, an outer circumferential surface of the photosensitive drum 63*a* is positively (+) or negatively (−) charged by the charging roller 63*b*, and an electrostatic latent image is formed on the outer circumferential surface of the photosensitive drum 63*a* by light transmitted from the exposure module 62. The electrostatic latent image formed on the outer circumferential surface of the photosensitive drum 63*a* is developed by the toner supplied by the developing roller 63*c*.

To form a color image, the development modules 63 may include a first development module 63K configured to develop an electrostatic latent image using a black toner, a second development module 63C configured to develop the electrostatic latent image using a cyan toner, a third development module 63M configured to develop the electrostatic latent image using a magenta toner, and a fourth development module 63Y configured to develop the electrostatic latent image using a yellow toner.

The transfer module 64 transmits the toner image formed on the photosensitive drum 63*a* to the printing medium P. The transfer module 64 may include a transfer belt 64*a* configured to acquire a toner image from the photosensitive drum 63 and transfer the toner image to a recording medium P.

The settling module 65 settles the toner image transferred to the printing medium P on the printing medium P by heat and pressure. The settling module 65 may include a heating roller 65*a* configured to heat the printing medium P to which a toner image is transferred, and a pressing roller 65*b* configured to press the printing medium P to which the toner image is transferred.

In this way, the image former 60 may form an image on the printing medium P through exposing-developing-transferring-settling processes while the printing medium P is being fed.

The image processor 20 may analyze and process an image acquired by the image acquirer 10 or received through the communicator 70. The image processor 20 may transmit an image to be formed on the printing medium P to the image former 60.

Specifically, the image processor 20 may classify color images into a black image, a cyan image, a magenta image, and a yellow image, and transmit the black image, the cyan image, the magenta image, and the yellow image to the image former 60.

The image processor 20 may divide a two-dimensional image into a plurality of one-dimensional images (linear images) and sequentially transmit the divided linear images to the exposure module 62 of the image former 60.

Such an image processor 20 may include a graphic processor 21 configured to perform an arithmetic operation for processing an image, and a graphic memory 22 configured to store program or data related to the arithmetic operation of the graphic processor 21.

The graphic processor 21 may include an arithmetic and logic unit (ALU) configured to perform an arithmetic operation for processing an image, and a memorial circuit configured to store data to be subject to arithmetic operation or data that has been subject to arithmetic operation.

The graphic memory 22 may include a volatile memory such as a static random access memory (S-RAM) and a dynamic random access memory (D-RAM), and a nonvolatile memory such as a read-only memory (ROM), an erasable programmable read-only memory (EPROM), an electrically erasable programmable read only memory (EEPROM), and a flash memory.

The graphic processor 21 and the graphic memory 22 may be implemented with separate chips or a single chip.

The controller 30 may control the above-described operations of the image acquirer 10, the user interface 40, the storage 50, the image former 60, the communicator 70, and the image processor 20.

For example, the controller 30 may control the exposure module 62 to transmit light in accordance with linear images transmitted from the image processor 20.

Such a controller 30 may include a control processor 31 configured to perform an arithmetic operation for controlling the operation of the image forming apparatus 1, and a control memory 32 configured to store program and data related to the arithmetic operation of the control processor 31.

The control processor 31 may include an ALU configured to perform an arithmetic operation for controlling the operation of the image forming apparatus 1, and a memorial circuit configured to store data to be subject to arithmetic operation or data that has been subject to arithmetic operation.

The control memory 32 may include a volatile memory such as a S-RAM and a D-RAM, and a nonvolatile memory such as a ROM, an EPROM, an EEPROM, and a flash memory.

The control processor 31 and the control memory 32 may be implemented with separate chips or a single chip.

The overall configuration of the image forming apparatus 1 has been described above.

Hereinafter, a PH included in the image forming apparatus 1 will be described.

Figure 4:
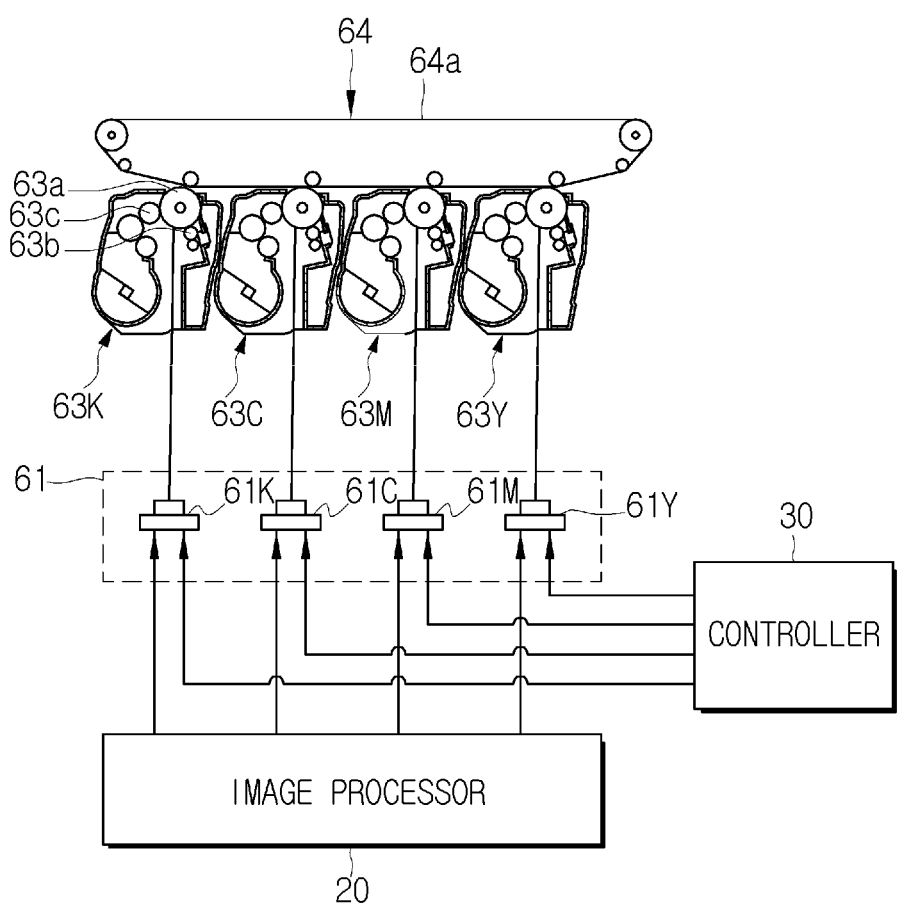
FIG. 4 illustrates an exposure module and development modules included in an image forming apparatus according to an example.
Figure 5:
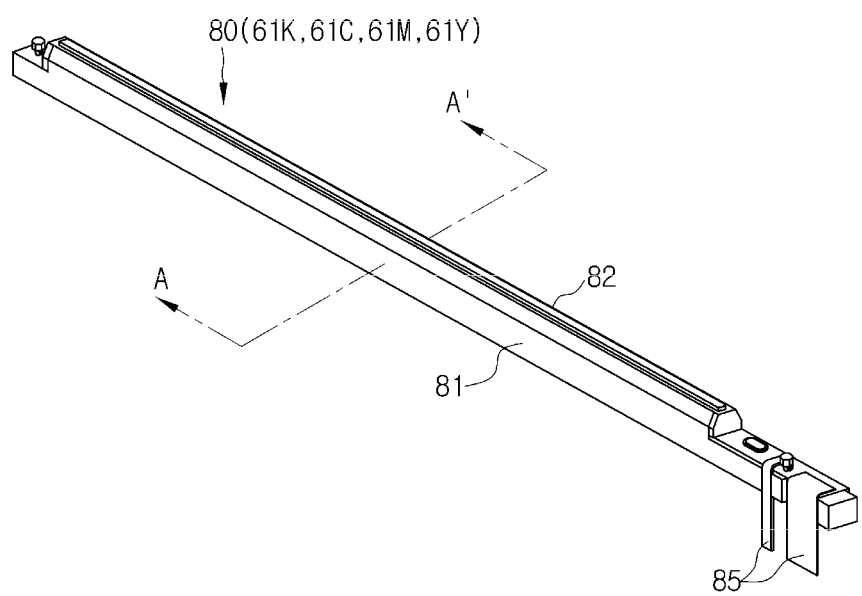
FIG. 5 illustrates an exterior of a PH according to an example.
Figure 6:
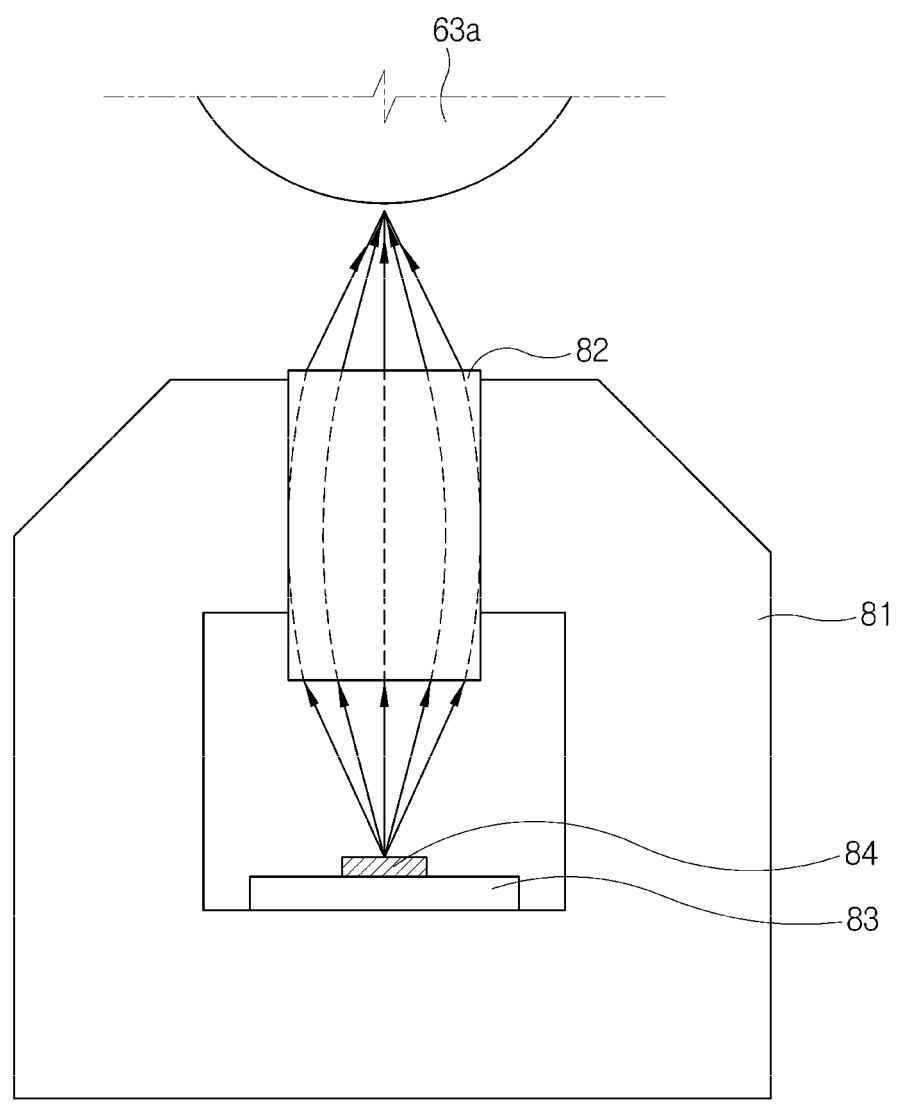
FIG. 6 illustrates the arrangement of a light emitting device included in the PH according to an example.
Figure 7:
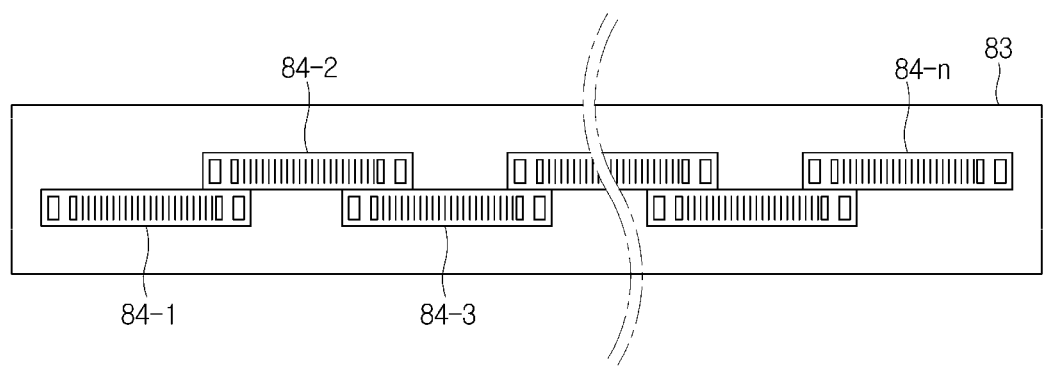
FIG. 7 illustrates a side cross-sectional view of the PH according to an example.

FIG. 4 illustrates an exposure module and development modules included in an image forming apparatus according to an example. FIG. 5 illustrates an exterior of a PH according to an example. FIG. 6 illustrates the arrangement of a light emitting device included in the PH according to an example. FIG. 7 illustrates a side cross-sectional view of the PH according to an example.

A PH will be described with reference to FIGS. 4, 5, 6, and 7.

An image forming apparatus 1 may form a color image.

To form the color image, the image forming apparatus 1 may mix a toner image formed by a cyan toner, a toner image formed by a magenta toner, a toner image formed by a yellow toner, and a toner image formed by a black toner.

Specifically, the image processor 20 classifies color images into a black image, a cyan image, a magenta image, and a yellow image, and transmits black image data, cyan image data, magenta image data, and yellow image data to the image former 60.

The image former 60 receives the black image data, the cyan image data, the magenta image data, and the yellow image data from the image processor 20 and separately forms a black toner image, a cyan toner image, a magenta toner image, and a yellow toner image. The image former 60 may form a color image by mixing the black toner image, the cyan toner image, the magenta toner image, and the yellow toner image.

In this way, to separately form the black toner image, the cyan toner image, the magenta toner image, and the yellow toner image, as illustrated in FIG. 4, an exposure module 61 may include a first PH 61K configured to transmit light having a pattern corresponding to the black image, a second PH 61C configured to transmit light having a pattern corresponding to the cyan image, a third PH 61M configured to transmit light having a pattern corresponding to the magenta image, and a fourth PH 61Y configured to transmit light having a pattern corresponding to the yellow image.

In this case, the first PH 61K may receive the black image from the image processor 20 and form an electrostatic latent image of the black image on the photosensitive drum 63a of a first development module 63K in accordance with a control signal of a controller 30. The black toner image is formed by the first development module 63K developing the electrostatic latent image of the black image using the black toner.

The second PH 61C may receive the cyan image from the image processor 20 and form the electrostatic latent image of the cyan image on the photosensitive drum 63a of a second development module 63C in accordance with the control signal of the controller 30. The cyan toner image is formed by the second development module 63C developing the electrostatic latent image of the cyan image using the cyan toner.

The third PH 61M may receive the magenta image from the image processor 20 and form the electrostatic latent image of the magenta image on the photosensitive drum 63a of a third development module 63M in accordance with the control signal of the controller 30. The magenta toner image is formed by the third development module 63M developing the electrostatic latent image of the magenta image using the magenta toner.

The fourth PH 61Y may receive the yellow image from the image processor 20 and form the electrostatic latent image of the yellow image on the photosensitive drum 63a of a fourth development module 63Y in accordance with the control signal of the controller 30. The yellow toner image is formed by the fourth development module 63Y developing the electrostatic latent image of the yellow image using the yellow toner.

The image forming apparatus 1 may form a two-dimensional image.

The image processor 20 may divide the two-dimensional image into a plurality of one-dimensional images (linear images) and sequentially transmit the divided linear images to the exposure module 62 of the image former 60.

The image former 60 sequentially forms one-dimensional toner images on the photosensitive drum 63a while the photosensitive drum 63a is rotated, and sequentially transfers the one-dimensional toner images formed on the photosensitive drum 63a to a printing medium P through a transfer belt 64a. As a result, a two-dimensional toner image may be formed on the printing medium P.

In this way, to form the one-dimensional toner images, as illustrated in FIG. 5, the exposure module 61 may include a PH 80 configured to transmit linear light. The PH 80 illustrated in FIG. 5 represents the above-described first PH 61K, second PH 61C, third PH 61M, and fourth PH 61Y, and each of the first PH 61K, the second PH 61C, the third PH 61M, and the fourth PH 61Y may have the same shape as the PH 80 illustrated in FIG. 5.

As illustrated in FIGS. 5, 6, and 7, the PH 80 includes a light source 84 configured to transmit light in accordance with image data, a printed circuit board 83 configured to support the light source 84, a connector 85 configured to provide electricity and image data to the light source 84, an optical member 82 configured to collect light transmitted from the light source 84, and a PH housing 81 configured to protect the light source 84, the printed circuit board 83, the connector 85, and the optical member 82.

The light source 84 may include a plurality of light emitting device arrays 84-1, 84-2, 84-3, . . . 84-n. The plurality of light emitting device arrays 84-1, 84-2, 84-3, . . . 84-n may be substantially arranged in a row, and each of the light emitting device arrays 84-1, 84-2, 84-3, . . . 84-n may include a plurality of light emitting devices arranged in a row.

In this way, the light source 84 may include a plurality of light emitting devices substantially arranged in a row.

For example, the light source 84 may include forty light emitting device arrays 84-1, 84-2, 84-3, . . . 84-n, and each of the light emitting device arrays 84-1, 84-2, 84-3, . . . 84-n may include 256 light emitting devices.

As a result, the light source 84 may include 10,240 light emitting devices substantially arranged in a row. The light source 54 may implement a resolution of 1200 dot per inch (DPI) or higher using the 10,240 light emitting devices arranged in a row.

The plurality of light emitting devices included in each of the light emitting device arrays 84-1, 84-2, 84-3, . . . 84-n may sequentially transmit light by a driving circuit.

For example, the plurality of light emitting devices included in the first light emitting device array 84-1 may sequentially transmit light, starting from a light emitting device disposed at the leftmost side to a light emitting device disposed at the rightmost side in accordance with an arrangement order.

A plurality of light emitting devices included in a second light emitting device array 84-2 may sequentially transmit light, starting from a light emitting device disposed at the rightmost side to a light emitting device disposed at the rightmost side in accordance with an arrangement order.

Thus, since the plurality of light emitting devices included in each of the light emitting device arrays 84-1, 84-2, 84-3, . . . 84-n sequentially transmit light, each of the light emitting device arrays 84-1, 84-2, 84-3, . . . 84-n may include a single terminal for receiving image data, and areas of the light emitting device arrays 84-1, 84-2, 84-3, . . . 84-n may be reduced.

The printed circuit board 83 fixes the light source 84. Specifically, the printed circuit board 83 may fix the plurality of light emitting device arrays 84-1, 84-2, 84-3, . . . 84-n included in the light source 84.

Along with the connector 85, the printed circuit board 83 may transmit electricity, control signals, and image data to each of the plurality of light emitting device arrays 84-1, 84-2, 84-3, . . . 84-n. Specifically, the connector 85 may transmit control signals transmitted from the controller 30 and image data transmitted from the image processor 20 to the printed circuit board 83, and the printed circuit board 83 may distribute the received control signals and image data to the plurality of light emitting device arrays 84-1, 84-2, 84-3, . . . 84-n.

The plurality of light emitting device arrays 84-1, 84-2, 84-3, . . . 84-n included in the light source 84 may sequentially transmit light in accordance with the control signals and the image data transmitted from the printed circuit board 83.

The optical member 82 concentrates light transmitted by the light source 84 on a surface of the photosensitive drum 63a.

As illustrated in FIG. 7, the light source 84 transmits light in all directions. The optical member 82 concentrates the light transmitted in all directions from the light source 84 on a surface of the photosensitive drum 63a. Thus, to concentrate light transmitted in all directions, the optical member 82 may include an image-forming optical lens.

As illustrated in FIG. 7, the optical member 82 may include a refractive index distributed lens (a distributed index lens, a gradient index lens, a GRIN lens, a rod lens) in which a refractive index is increased further away from the center of a lens in order for a light traveling direction to be changed.

The PH housing 81 may fix the light source 84, the printed circuit board 83, the connector 85, and the optical member 82, and protect the light source 84, the printed circuit board 83, the connector 85, and the optical member 82 from an external impact.

As described above, the PH 80 may include the plurality of light emitting device arrays 84-1, 84-2, 84-3, . . . 84-n arranged in a row, and each of the plurality of light emitting device arrays 84-1, 84-2, 84-3, . . . 84-n may include a plurality of light emitting devices arranged in a row.

The configuration of the PH 80 has been described above.

Hereinafter, a configuration and operation of a light emitting device array included in the PH 80 will be described.

Figure 8:
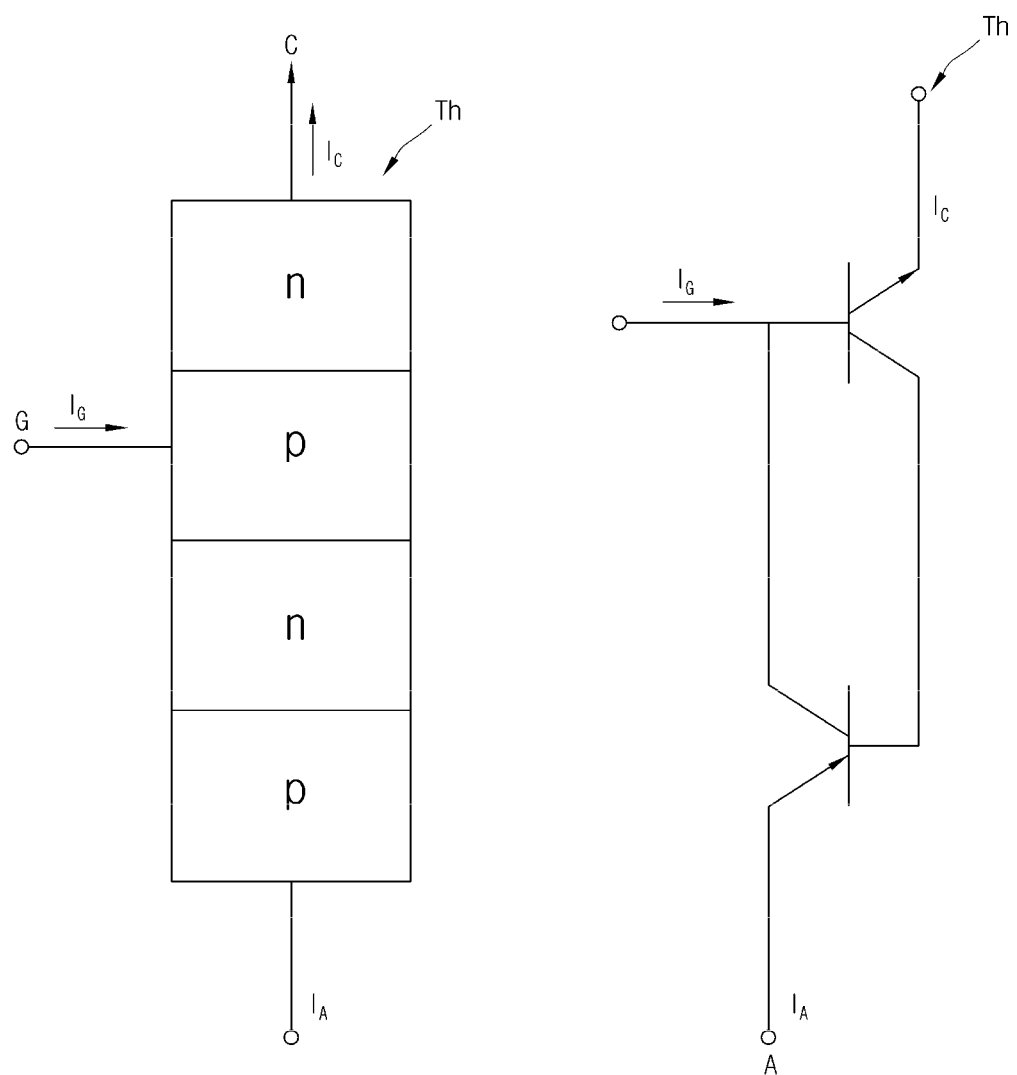
FIG. 8 briefly illustrates a thyristor.
Figure 9:
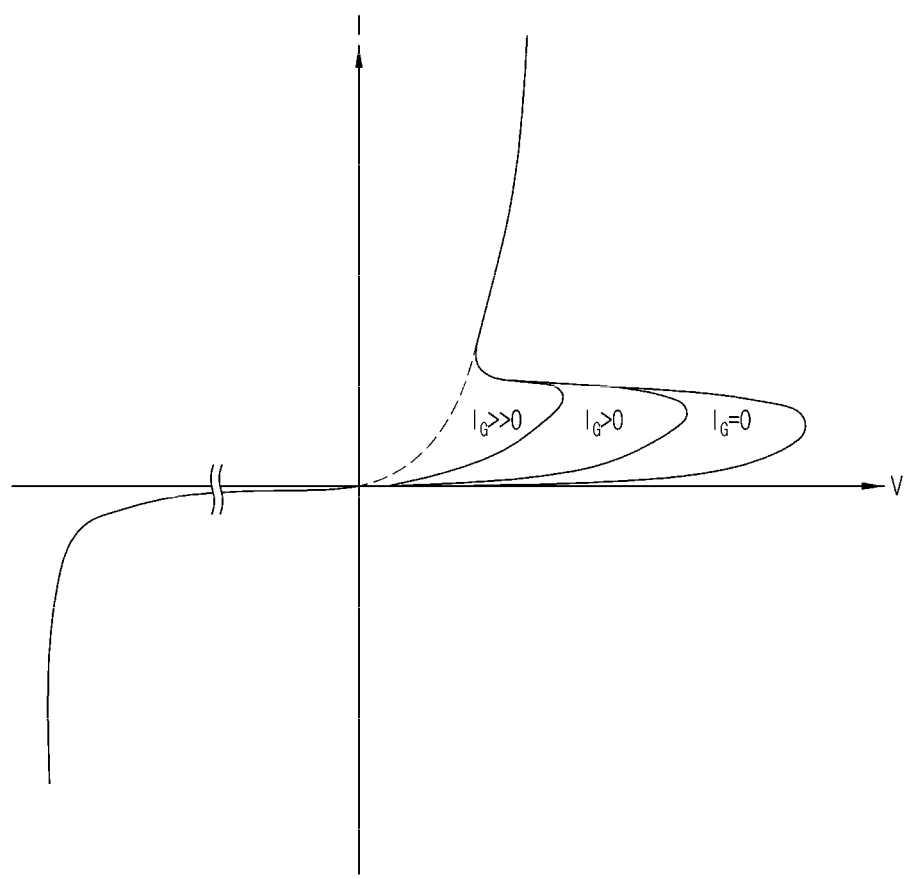
FIG. 9 illustrates a current-voltage relationship of the thyristor.

FIG. 8 briefly illustrates a thyristor. FIG. 9 illustrates a current-voltage relationship of the thyristor. FIGS. 8 and 9 are merely drawings for describing the thyristor, and a light emitting device according to an example is not limited by FIGS. 8 and 9.

A LED, a light emitting thyristor, or a laser diode (LD) has been widely used as a light emitting device. A light emitting thyristor, which is a three-terminal light emitting device, may be used in the PH.

As illustrated in FIG. 8, a thyristor Th is formed of a p-n-p-n diode structure, and includes an anode terminal A, a cathode terminal C, and a gate terminal G.

The p-n-p-n diode is a diode in which a p-type semiconductor, an n-type semiconductor, a p-type semiconductor, and an n-type semiconductor are sequentially joined.

Such a p-n-p-n diode may not allow passage of a reverse current and may either block or allow passage of forward current depending on conditions. Specifically, in a blocking state, the p-n-p-n diode may block flow of the current, and in a conductive state, the p-n-p-n diode may allow passage of forward current (current form the anode terminal to the cathode terminal).

The blocking state and the conductive state of the p-n-p-n diode are determined in accordance with a forward voltage applied to the p-n-p-n diode.

For example, when a voltage lower than a breakover voltage is applied to the p-n-p-n diode in the blocking state, the p-n-p-n diode maintains the blocking state and does not allow passage of current.

When a voltage higher than the breakover voltage is applied to the p-n-p-n diode in the blocking state, the p-n-p-n diode is switched to the conductive state and allows passage of current.

Particularly, in the case of the p-n-p-n diode switched to the conductive state, a level of voltage applied to both ends of the p-n-p-n diode is lower than the breakover voltage. In other words, when the p-n-p-n diode is switched from the blocking state to the conductive state, a voltage at the both ends of the p-n-p-n diode is decreased.

In this case, when a terminal (a gate terminal) capable of supplying a current to a p-type semiconductor disposed between two n-type semiconductors of the p-n-p-n diode is provided, a thyristor Th illustrated at the left side in FIG. 8 is formed.

As illustrated at the right side in FIG. 8, such a thyristor Th may be modeled by coupling between an npn-type bipolar junction transistor (BJT) and a pnp-type BJT. Specifically, the thyristor Th has a form in which a collector terminal of the npn-type BJT and a base terminal of the pnp-type BJT are coupled to each other, and a base terminal of the npn-type BJT and a collector terminal of the pnp-type BJT are coupled to each other. The gate terminal G of the thyristor Th is connected to the base terminal of the npn-type BJT.

In such a thyristor Th, a value of a breakover voltage varies in accordance with a voltage between the gate terminal G and the cathode terminal C.

Specifically, as illustrated in FIG. 9, when a current IG supplied to the gate terminal G is "0," the thyristor Th is operated in the same way as the p-n-p-n diode.

When the current IG due to a voltage VGC between the gate terminal G and the cathode terminal C is supplied to the gate terminal G, a breakover voltage of the thyristor Th is decreased. Further, the breakover voltage of the thyristor Th is gradually decreased as the current IG supplied to the gate terminal G is increased.

In this case, when the voltage VGC between the cathode terminal C and the gate terminal G becomes an energy band gap of a material forming the thyristor Th, the thyristor Th may be operated in a similar way as a PN junction diode. For example, in a case in which the thyristor Th is formed of gallium-arsenide (GaAs, energy band gap: about 1.4 [eV]), the GaAs thyristor may be operated in a similar way as a GaAs PN junction diode when a voltage between the cathode terminal C and the gate terminal G becomes 1.4[V].

The thyristor Th in the conductive state (on-state) may maintain the conductive state (on-state) even when the current IG due to the voltage VGC between the cathode terminal C and the gate terminal G is blocked.

In other words, when a voltage lower than a breakover voltage is applied between the anode terminal A and the cathode terminal C of the thyristor Th, the thyristor Th is in the blocking state (off-state). In this case, when the voltage VGC between the cathode terminal C and the gate terminal G becomes higher than the energy band gap of the material forming the thyristor Th, the thyristor Th is switched to the conductive state (on-state).

The thyristor Th in the conductive state (on-state) may maintain the conductive state (on-state) even when the voltage VGC is not applied between the cathode terminal C and the gate terminal G. Particularly, the thyristor Th in the conductive state (on-state) is turned off when a voltage between the anode terminal A and the cathode terminal C is blocked.

Like a PN junction diode, in the on-state thyristor Th, a current due to positive holes h+ and a current due to electrons e− flow. Recombination of the positive holes h+ and the electrons e− may occur, and light may be emitted due to the recombination of the positive holes h+ and the electrons e−.

In other words, like the PN junction diode, the thyristor Th may also be used as a light emitting device.

Due to the above-described current-voltage characteristic and a light-emitting characteristic of the thyristor Th, the thyristor Th may be used as a light emitting device of a PH.

Figure 10:
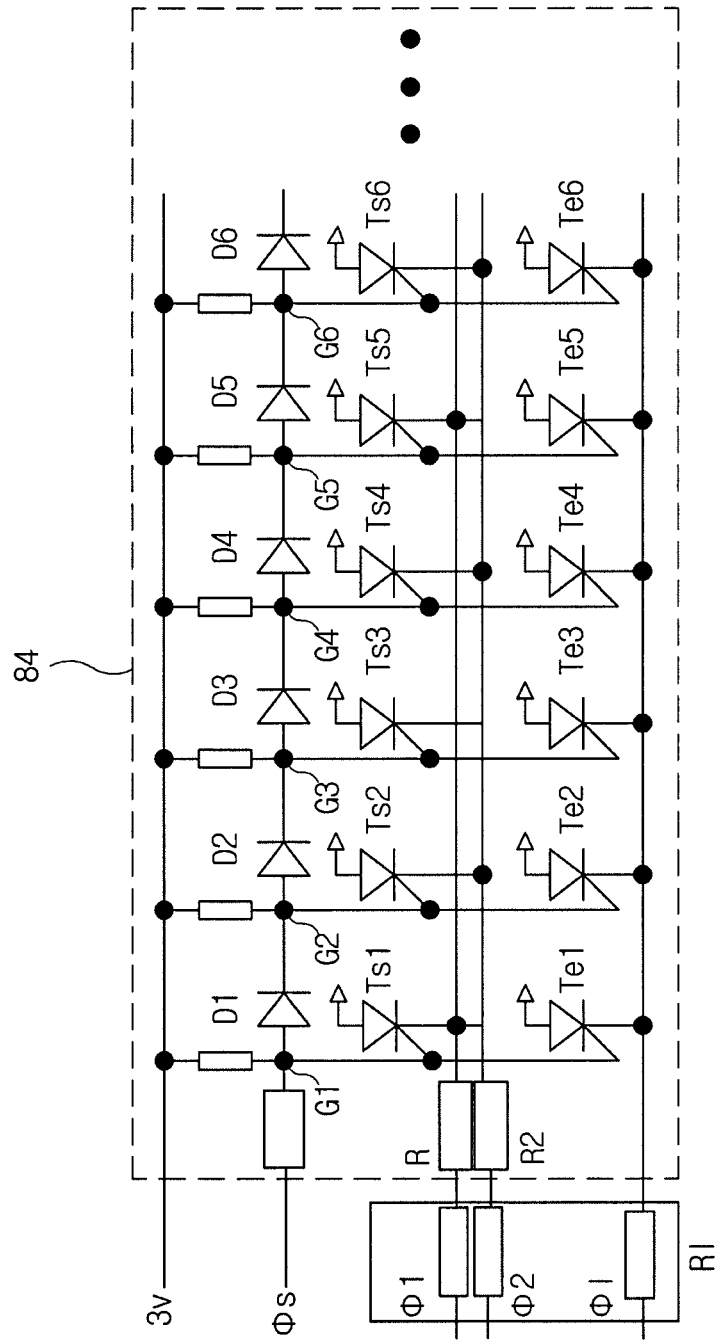
FIG. 10 illustrates a driving circuit of a PH according to an example.

FIG. 10 illustrates a driving circuit of a PH according to an example. FIG. 11 illustrates control signals and image data of the PH according to an example.

As illustrated in FIG. 10, a light emitting device array 84 may include a plurality of thyristors Ts1 and Te1, Ts2 and Te2, Ts3 and Te3, . . . and a plurality of diodes D1, D2, D3, . . . .

Specifically, the light emitting device array 84 may include light-emitting thyristors Te1, Te2, Te3, . . . , scanning thyristors Ts1, Ts2, Ts3, . . . configured to sequentially turn on the light-emitting thyristors Te1, Te2, Te3, . . . , and diodes D1, D2, D3, . . . .

An operation start signal φs for initially turning on the light-emitting thyristors Te1, Te2, Te3, . . . , a first scan signal φ1 and a second scan signal φ2 for sequentially turning on the light-emitting thyristors Te1, Te2, Te3, . . . , and an image data signal φi for sequentially inputting image data may be input to the light emitting device array 84.

A gate terminal of a first light-emitting thyristor Te1 and a gate terminal of a first scanning thyristor Ts1 are connected to a first gate node G1, and a gate terminal of a second light-emitting thyristor Te2 and a gate terminal of a second scanning thyristor Ts2 are connected to a second gate node G2. A first diode D1 may be provided between the first gate node G1 and the second gate node G2. In other words, each of the light-emitting thyristors Te1, Te2, Te3, . . . and each of the scanning thyristors Ts1, Ts2, Ts3, . . . may form a pair, and the diodes D1, D2, D3, . . . may be respectively provided between the pairs of thyristors Ts1 and Te1, Ts2 and Te2, Ts3 and Te3, . . . .

The first gate node G1 connected to the gate terminals of the light-emitting thyristors Te1, Te2, Te3, . . . and the scanning thyristors Ts1, Ts2, Ts3, . . . may be connected to an operation start signal φs line.

The anode terminals of the light-emitting thyristors Te1, Te2, Te3, . . . may be connected to a power supply (3V), and the cathode terminals thereof may be connected to an image data signal φi line.

Cathode terminals of a first scanning thyristor Ts1, a third scanning thyristor Ts3, and a fifth scanning thyristor T5 may be connected to a first scan signal φ1 line, and cathode terminals of a second scanning thyristor Ts2, a fourth scanning thyristor Ts4, and a sixth scanning thyristor Ts6 may be connected to a second scan signal φ2 line. In other words, the cathode terminals of the scanning thyristors Ts1, Ts2, Ts3, . . . may be alternately connected to the first scan signal φ1 line and the second scan signal φ2 line.

Anode terminals of the scanning thyristors Ts1, TS2, Ts3, . . . may be connected to the power supply (3V).

The operation start signal φs, the first scan signal φ1, and the second scan signal φ2 may be input to the light-emitting thyristors Te1, Te2, Te3, . . . and the scanning thyristors Ts1, Ts2, Ts3, . . . for the light-emitting thyristors Te1, Te2, Te3, . . . and the scanning thyristors Ts1, Ts2, Ts3, . . . to be sequentially turned on.

For example, the operation start signal φs, the first scan signal φ1, and the second scan signal 92 shown in FIG. 11 may be input.

According to FIG. 11, operations of the light-emitting thyristors Te1, Te2, Te3, . . . and the scanning thyristors Ts1, Ts2, Ts3, . . . may be differentiated into a plurality of phases, and a single scanning thyristor Ts1, Ts2, Ts3, . . . may be turned on in every phase.

First, before a light-emitting operation, the operation start signal φs is "low (0V)," and the first scan signal φ1 and the second scan signal φ2 are "high (3V)." The image data signal φi is "high (3V)."

Since the operation start signal φs is "low (0V)," and the first scan signal φ1 and the second scan signal φ2 are "high (3V)," a voltage of 0[V] is applied between anode terminals and cathode terminals of the scanning thyristors Ts1, Ts2, Ts3, . . . , and the scanning thyristors Ts1, Ts2, Ts3, . . . are maintained in the off-state.

Since the operation start signal φs is "low (0V)," and image data signal φi is "high (3V), a voltage of 0[V] is applied between anode terminals and cathode terminals of the light-emitting thyristors Te1, Te2, Te3, . . . , and the light-emitting thyristors Te1, Te2, Te3, . . . are also maintained in the off-state.

Then, in a first phase (Phase 1), the first scan signal $\varphi 1$ becomes "low (0V)," and the second scan signal $\varphi 2$ is maintained "high (3V)." The operation start signal $\varphi s$ becomes "high (3V)," and first image data (data1) is input as the image data signal $\varphi i$.

Since the first scan signal $\varphi 1$ is "low (0V)," a voltage of 3[V] is applied between the anode terminal and the cathode terminal of the first scanning thyristor Ts1, and since the operation start signal $\varphi s$ is "high (3V)," a voltage of 3[V] is applied between the gate terminal and the cathode terminal of the first scanning thyristor Ts1. Thus, since the voltage of 3[V] is applied between the anode terminal and the cathode terminal, and the voltage of 3[V] is applied between the gate terminal and the cathode terminal, the first scanning thyristor Ts1 may be turned on.

When the first scanning thyristor Ts1 is switched to the on-state, a voltage of the gate terminal of the first scanning thyristor Ts1 becomes substantially similar to a voltage of the anode terminal thereof. For example, when a voltage of the power supply applied to the anode terminal is 3[V], a voltage of the gate terminal of the first scanning thyristor Ts1 is about 3[V]. In other words, a voltage of the first gate node G1 is about 3[V] while the first scanning thyristor Ts1 is in the on-state.

In this case, a voltage of the second gate node G2 may be a difference between a voltage of the first gate node G1 and a voltage drop of the first diode D1. For example, in a case in which the first diode D1 is GaAs (energy band gap: about 1.4 [eV]), a voltage drop of the first diode D1 is about 1.4[V]. Therefore, a voltage of the second gate node G2 is about 1.6[V], and a voltage of a third gate node G3 is about 0.2[V]. As a result, the third scanning thyristor Ts3 is maintained in the off-state.

Since the second scan signal $\varphi 2$ is "high (3V)," the second scanning thyristor Ts1 is maintained in the off-state.

Since the voltage of the first gate node G1 is about 3[V], the first light-emitting thyristor Te1 may be turned on or maintained in the off-state in accordance with a voltage of the cathode terminal, that is, the first image data (data1), which is the image data signal $\varphi i$. For example, as illustrated in FIG. 11, when the first image data (data1) is "low (0V)," the first light-emitting thyristor Te1 may also be turned on and transmit light.

Then, in a second phase (Phase 2), the first scan signal $\varphi 1$ becomes "high (3V)," and the second scan signal $\varphi 2$ becomes "low (0V)." Second image data (data2) is input as the image data signal $\varphi i$.

In this case, the second scan signal $\varphi 2$ becomes "low (0V)" before the first scan signal $\varphi 1$ becomes "high (3V)," and the image data signal $\varphi i$ becomes "high (3V)" while both the first scan signal $\varphi 1$ and the second scan signal $\varphi 2$ are "low (0V)."

For example, as illustrated in FIG. 11, the second scan signal $\varphi 2$ may become "low (0V)" at a first time T1, and the first scan signal $\varphi 1$ may become "high (3V)" at a second time T2. The image data signal $\varphi i$ becomes "high (3V)" between the first time T1 and the second time T2.

As described above, the voltage of the second gate node G2 may be maintained at about 1.6[V] while the first scanning thyristor Ts1 is in the on-state. When the second scan signal $\varphi 2$ becomes "low (0V)" while the voltage of the second gate node G2 is about 1.6[V], a voltage between the gate terminal and the cathode terminal of the second scanning thyristor Ts2 may be about 1.4[V], and a voltage between the anode terminal and the cathode terminal thereof may be about 3[V]. As a result, the second scanning thyristor Ts2 may be turned on.

Since the image data signal $\varphi i$ becomes "high (3V)," the first light-emitting thyristor Te1 is also turned off, and when the first scan signal $\varphi 1$ becomes "high (3V)," the first scanning thyristor Ts1 is turned off. In this case, since the first scanning thyristor Ts1 is turned off, the voltage of the first gate node G1 becomes 0[V], and the first light-emitting thyristor Te1 is not turned on even when a voltage of the cathode terminal thereof is increased.

Since the second scanning thyristor Ts2 is turned on, the voltage of the second gate node G2 is about 3[V]. A voltage of the third gate node G3 is about 1.6[V], and a voltage of a fourth gate node G4 is about 0.2[V]. Therefore, the fourth scanning thyristor Ts4 is maintained in the off-state.

Since the first scan signal $\varphi 1$ is "high (3V)," the third scanning thyristor Ts3 is maintained in the off-state.

Since a voltage of the second gate node G2 is about 3[V], the second light-emitting thyristor Te2 may be turned on or maintained in the off-state in accordance with a voltage of the cathode terminal, that is, the second image data (data2), which is the image data signal $\varphi i$. For example, as illustrated in FIG. 11, when the second image data (data2) is "high (3V)," the second light-emitting thyristor Te2 is maintained in the off-state and does not transmit light.

Then, in a third phase (Phase 3), the first scan signal $\varphi 1$ becomes "low (0V)," and the second scan signal $\varphi 2$ becomes "high (3V)." Third image data (data3) is input to the image data signal $\varphi i$ line.

In this case, the first scan signal $\varphi 1$ becomes "low (0V)" before the second scan signal $\varphi 2$ becomes "high (3V)," and the image data signal $\varphi i$ becomes "high (3V)" while both the first scan signal $\varphi 1$ and the second scan signal $\varphi 2$ are "low (0V)."

For example, as illustrated in FIG. 11, the first scan signal $\varphi 1$ may become "low (0V)" at a third time T3, and the second scan signal $\varphi 2$ may become "high (3V)" at a fourth time T4. The image data signal $\varphi i$ becomes "high (3V)" between the third time T3 and the fourth time T4.

As described above, the voltage of the third gate node G3 may be maintained at about 1.6[V] while the second scanning thyristor Ts2 is in the on-state. When the first scan signal $\varphi 1$ becomes "low (0V)" while the voltage of the third gate node G3 is about 1.6[V], a voltage between the gate terminal and the cathode terminal of the third scanning thyristor Ts3 may be about 1.4[V], and a voltage between the anode terminal and the cathode terminal thereof may be about 3[V]. As a result, the third scanning thyristor Ts3 may be turned on.

Since the image data signal $\varphi i$ becomes "high (3V)," the second light-emitting thyristor Te2 is turned off, and when the second scan signal $\varphi 2$ becomes "high (3V)," the second scanning thyristor Ts2 is turned off. In this case, since the second scanning thyristor Ts2 is turned off, the voltage of the second gate node G2 becomes 0[V], and the second light-emitting thyristor Te2 is not turned on even when a voltage of the cathode terminal thereof is increased.

Since the third scanning thyristor Ts3 is turned on, the voltage of the third gate node G3 is about 3[V]. A voltage of the fourth gate node G4 is about 1.6[V], and a voltage of a fifth gate node G5 is about 0.2[V]. Therefore, a fifth scanning thyristor Ts4 is maintained in the off-state.

Since the second scan signal $\varphi 2$ is "high (3V)," the fourth scanning thyristor Ts4 is maintained in the off-state.

Since a voltage of the third gate node G3 is about 3[V], the third light-emitting thyristor Te3 may be turned on or maintained in the off-state in accordance with a voltage of the cathode terminal, that is, the third image data (data3), which is the image data signal $\varphi i$. For example, as illustrated in FIG. 11, when the third image data (data3) is "low (0V)," the third light-emitting thyristor Te3 may be turned on and transmit light.

As described above, the scanning thyristors Ts1, Ts2, Ts3, ... included in the light emitting device array 84 may be sequentially turned on, and the light-emitting thyristors Te1, Te2, Te3, ... may sequentially transmit light in accordance with image data.

The configuration and operation of the light emitting device array 84 have been described above.

Hereinafter, a configuration and operation of a light-emitting thyristor included in the light emitting device array 84 will be described.

FIG. 12 illustrates a side cross-sectional view of a light emitting device according to an example.

As illustrated in FIG. 12, a light emitting device 100 has a thyristor structure, fundamentally based on the p-n-p-n diode structure, in which a gate terminal is connected to a p-type semiconductor between two n-type semiconductors.

The light emitting device 100 may include a light emitting layer 110 configured to transmit light, a reflective layer 120 configured to reflect light, and a substrate 130 configured to support the light emitting device 100.

The light emitting device 100 may be formed of various semiconductor materials. For example, a direct-type semiconductor such as GaAs, gallium nitride (GaN), and indium arsenide (InAs) may be used. Particularly, GaAs has an energy band gap of about 1.43 [eV], and may emit light substantially close to infrared light. Aluminum gallium arsenide (AlGaAs) in which Al is mixed with GaAs may have an optical characteristic that varies in accordance with a mixing percentage of Al.

Hereinafter, the light emitting device 100 will be assumed as being formed of GaAs or AlGaAs.

The substrate 130 of the light emitting device 100 may be formed of an intrinsic GaAs semiconductor in which impurities are not mixed, or may be formed of a p-type GaAs semiconductor in which p-type impurities such as zinc (Zn) (acceptors) are mixed.

By growing an epitaxial layer on a substrate Sub formed of an intrinsic semiconductor or a p-type semiconductor, a p-n-p-n diode structure including the light emitting layer 110 and the reflective layer 120 may be formed.

For example, a first p-type semiconductor layer p1 may be formed using a vapor phase epitaxy (VPE) or a molecular beam epitaxy (MBE). Specifically, the first p-type semiconductor layer p1 may be formed by growing an epitaxial layer in the atmosphere in which p-type impurities such as Zn (acceptors) are mixed, based on Ga and As.

The first p-type semiconductor layer p1 may also be formed as an AlGaAs semiconductor by mixing Al in addition to Ga. In this case, an Al:Ga mixing percentage may vary in accordance with a size of an energy band gap that is attempted to be designed. For example, the first p-type semiconductor layer p1 may be $Al_{35}Ga_{65}As$, in which an Al:As ratio is 35:65. In this case, an energy band gap is about 1.85 [eV].

When the mixing percentage of Al is changed during the growth of the first p-type semiconductor layer p1, a p-type AlGaAs semiconductor, in which a mixing percentage of Al is changed in accordance with a position, is formed. For example, when, during the growth of the first p-type semiconductor layer p1, an Al:Ga ratio is changed from 90:10 to 23:77 and then reverted from 23:77 to 90:10, an $Al_{90}Ga_{10}As$ semiconductor layer, in which the Al:Ga ratio is 90:10, and a $Al_{23}Ga_{77}As$ semiconductor layer, in which the Al:Ga ratio is 23:77, may be formed in the first p-type semiconductor layer p1. When the Al:Ga ratio is repetitively changed, the $Al_{90}Ga_{10}As$ semiconductor layer, in which the Al:Ga ratio is 90:10, and the $Al_{23}Ga_{77}As$ semiconductor layer, in which the Al:Ga ratio is 23:77, may be repetitively formed in the first p-type semiconductor layer p1.

Thus, the p-type AlGaAs semiconductor in which the mixing percentage of Al is changed becomes the reflective layer 120 capable of reflecting light. A configuration of the reflective layer 120 will be described in detail below.

Then, a first n-type semiconductor layer n1 may be formed using a VPE or a MBE. For example, the first n-type semiconductor layer n1 may be formed by growing, based on Ga and As, an epitaxial layer in the atmosphere in which n-type impurities such as sulfur (S) (donors) are mixed.

The first n-type semiconductor layer n1 may also be formed as an AlGaAs semiconductor by mixing Al in addition to Ga. In this case, an Al:Ga mixing percentage may vary in accordance with a wavelength of light that is attempted to be transmitted. In other words, the Al:Ga mixing percentage may vary in accordance with a size of an energy band gap that is attempted to be designed. For example, in a case in which light having a wavelength of 780 nm is attempted to be transmitted, an energy band gap is about 1.6 [eV], and an Al:As ratio is 13:87.

As a result, the first n-type semiconductor layer n1 may be $Al_{13}Ga_{87}As$ in which the Al:As ratio is 13:87.

Then, a second p-type semiconductor layer p2 may be formed using a VPE or a MBE. For example, the second p-type semiconductor layer p2 may be formed by growing, based on Ga and As, an epitaxial layer in the atmosphere in which p-type impurities such as Zn (acceptors) are mixed.

The second p-type semiconductor layer p2 may also be formed as an AlGaAs semiconductor by mixing Al in addition to Ga. In this case, an Al:Ga mixing percentage may vary in accordance with a wavelength of light that is attempted to be transmitted. In other words, the Al:Ga mixing percentage may vary in accordance with a size of an energy band gap that is attempted to be designed. For example, in a case in which light having a wavelength of 780 nm is attempted to be transmitted, an energy band gap is about 1.6 [eV], and an Al:As ratio is 13:87.

As a result, the second p-type semiconductor layer n1 may be $Al_{13}Ga_{87}As$ in which the Al:As ratio is 13:87.

Then, a second n-type semiconductor layer n2 may be formed using a VPE or a MBE. For example, the second n-type semiconductor layer n2 may be formed by growing, based on Ga and As, an epitaxial layer in the atmosphere in which n-type impurities such as S (donors) are mixed.

The second n-type semiconductor layer n2 may also be formed as an AlGaAs semiconductor by mixing Al in addition to Ga. In this case, an Al:Ga mixing percentage may vary in accordance with a size of an energy band gap that is attempted to be designed. For example, the second n-type semiconductor layer n2 may be $Al_{25}Ga_{75}As$, in which an Al:As ratio is 25:75. In this case, an energy band gap is about 1.75 [eV].

When the above-described first p-type semiconductor p1, first n-type semiconductor n1, second p-type semiconductor p2, and second n-type semiconductor n2 are formed and joined with each other, a p-n-p-n diode structure is formed. The p-n-p-n diode structure becomes the light emitting layer 110 capable of transmitting light.

As described above, the reflective layer 120 is formed at the first p-type semiconductor p1 of the p-n-p-n diode structure, and the light emitting layer 110 is formed by coupling the first p-type semiconductor p1, the first n-type semiconductor n1, the second p-type semiconductor p2, and the second n-type semiconductor n2.

Although the light emitting layer 110 and the reflective layer 120 will be separately described below, the light emitting layer 110 and the reflective layer 120 are parts of the p-n-p-n diode structure.

First, the light emitting layer 110 will be described.

FIG. 13 illustrates a light emitting layer of the light emitting device according to an example. FIG. 14 illustrates an energy band diagram of the light emitting device according to an example. FIG. 15 illustrates a spectrum of light transmitted from the light emitting device according to an example.

As illustrated in FIG. 13, a light emitting layer 110 may include a first p-type semiconductor layer 111, a first n-type semiconductor layer 112, a second p-type semiconductor layer 113, and a third n-type semiconductor layer 114, and the first p-type semiconductor layer 111, the first n-type semiconductor layer 112, the second p-type semiconductor layer 113, and the second n-type semiconductor layer 114 may be sequentially laminated in that order.

In this case, each of the first p-type semiconductor layer 111, the first n-type semiconductor layer 112, the second p-type semiconductor layer 113, and the second n-type semiconductor layer 114 may be a AlGaAs semiconductor in which Al is mixed with GaAs. Mixing percentages of Al of the first p-type semiconductor layer 111, the first n-type semiconductor layer 112, the second p-type semiconductor layer 113, and the third n-type semiconductor layer 114 may be different from each other.

For example, the first p-type semiconductor layer 111 may be an $Al_{35}Ga_{65}As$ semiconductor in which an Al:Ga ratio is 35:65. In this case, an energy band gap of the $Al_{35}Ga_{65}As$ semiconductor in which the Al:Ga ratio is 35:65 is about 1.85 [eV].

The first n-type semiconductor layer 112 may be an $Al_{13}Ga_{87}As$ semiconductor in which an Al:Ga ratio is 13:87. In this case, an energy band gap of the $Al_{13}Ga_{87}As$ semiconductor in which the Al:Ga ratio is 13:87 is about 1.6 [eV].

The second p-type semiconductor layer 113 may be an $Al_{13}Ga_{87}As$ semiconductor in which an Al:Ga ratio is 13:87. In this case, an energy band gap of the $Al_{13}Ga_{87}As$ semiconductor in which the Al:Ga ratio is 13:87 is about 1.6 [eV].

The second n-type semiconductor layer 114 may be an $Al_{25}Ga_{75}As$ semiconductor in which an Al:Ga ratio is 25:75. In this case, an energy band gap of the $Al_{25}Ga_{75}As$ semiconductor in which the Al:Ga ratio is 25:75 is about 1.75 [eV].

By adjusting the mixing percentages of Al of the first p-type semiconductor layer 111, the first n-type semiconductor layer 112, the second p-type semiconductor layer 113, and the second n-type semiconductor layer 114, light may be transmitted from the first n-type semiconductor layer 112 or the second p-type semiconductor layer 113.

When a light emitting device 100 including the light emitting layer 110 is turned on, as illustrated in FIG. 13, electrons e− are supplied from a cathode terminal C to a conduction band Ec of the light emitting device 100, and positive holes h+ are supplied from an anode terminal A to a valence band Ev of the light emitting device 100. The supplied electrons e− and positive holes h+ may be recombined over an energy band gap Eg at the first n-type semiconductor layer 112 or the second p-type semiconductor layer 113. Particularly, since mobility of the electrons e− is higher than mobility of the positive holes h+, the recombination of the electrons e− and the positive holes h+ may occur at the first n-type semiconductor layer 112.

When the electrons e− and the positive holes h+ are recombined, light having energy corresponding to an energy band gap of a semiconductor is transmitted.

For example, in a case in which the first n-type semiconductor layer 112 is an $Al_{13}Ga_{87}As$ semiconductor in which an Al:Ga ratio is 13:87, as illustrated in FIG. 14, an energy band gap of the first n-type semiconductor 112 is about 1.6 [eV], and light L having a wavelength of 780 nm is transmitted by the recombination of the electrons e− and the positive holes h+. In other words, infrared light may be transmitted from the first n-type semiconductor layer 112.

As such, the light generated by the recombination of the electrons e− and the positive holes h+ is not emitted in a specific direction and may be emitted in all directions.

Thus, a portion of the light emitted in all directions may be absorbed by a substrate 130 and converted into thermal energy. As a result, temperature of the light emitting device 100 may rise. An energy band gap of a semiconductor device is changed in accordance with a change in temperature of the semiconductor device. Specifically, an energy band gap of a semiconductor device is decreased in accordance with an increase in temperature of the semiconductor device.

Therefore, an energy band gap of the first n-type semiconductor layer 112 is decreased in accordance with the increase in temperature of the light emitting device 100, and a wavelength of light generated by recombination of the electrons e− and the positive holes h+ is increased.

For example, in a case in which an $Al_{13}Ga_{87}As$ semiconductor, in which an Al:Ga ratio is 13:87, transmits light having a wavelength of about 780 nm, as illustrated in FIG. 15, a wavelength of emitted light may be increased in accordance with an increase of temperature of the $Al_{13}Ga_{87}As$ semiconductor.

Specifically, a change in wavelength in accordance with a change in temperature of an AlGaAs semiconductor may be expressed as $\Delta\lambda=0.24/\Delta T$, where $\Delta\lambda$ is a change in wavelength, and $\Delta T$ is a change in temperature. For example, when temperature of the light emitting device 100 increases by 20° C., a wavelength of light emitted by the light emitting device 100 may be increased by about 4.8 nm.

As described above, the light emitting layer 110 may transmit light having a specific wavelength due to the recombination of the electrons e− and the positive holes h+. A wavelength of light transmitted by the light emitting layer 110 may be increased in accordance with an increase of temperature of the light emitting device 100

Hereinafter, the reflective layer 120 will be described.

FIG. 16 illustrates light emission and light reflection of the light emitting device according to an example. FIG. 17 illustrates light reflection by a Bragg reflector. FIG. 18 illustrates a refractive index of light in accordance with a percentage of Al in an AlGaAs semiconductor.

As illustrated in FIG. 16, light is emitted in all directions from a light emitting layer 110. Specifically, a portion of light L1 generated from the light emitting layer 110 may be emitted to the outside, and a portion of light L2 generated from the light emitting layer 110 may be emitted toward a substrate 130 of a light emitting device 110.

In a case in which the light emitted toward the substrate 130 is absorbed by the substrate 130, temperature of the light emitting device 100 may rise sharply, and performance of the light emitting device 100 may be degraded.

To prevent such degradation, a reflective layer 120 may be provided between the light emitting layer 110 and the substrate 130, and light emitted toward the substrate 130 may be reflected by the reflective layer 120.

For example, a portion of light L3 of the light emitted toward the substrate 130 may be reflected by the reflective layer 120 and emitted to the outside, and the other portion of light L4 may pass through the reflective layer 120 and be absorbed by the substrate 130.

In this case, in accordance with its structure, the reflective layer 120 may reflect light having a specific wavelength or reflect light having a specific range of wavelengths.

The reflective layer 120 may include a Bragg mirror using Bragg reflection.

The Bragg reflection refers to a phenomenon in which, in a case in which light is incident on a material including two layers having different refractive indices, a reflectivity of the material is extremely high at a specific incident angle.

Specifically, in a case in which light L1 is incident on a material including a first layer having a first refractive index index_1 and a second layer having a second refractive index index_2 as illustrated in FIG. 17, first reflected light L2 may be reflected from a boundary surface B1 of the first layer, second reflected light L3 may be reflected from a boundary surface B2 between the first layer and the second layer, and third reflected light L4 may be reflected from a boundary surface B3 of the second layer. Here, in a case in which a thickness of each layer satisfies Equation 1 below, the first reflected light L2, the second reflected light L3, and the third reflected light L4 may cause constructive interference with each other.

$$d = \frac{\lambda}{4n} \quad \text{[Equation 1]}$$

Here, d represents a thickness of each layer, λ represents a wavelength of reflected light, and n represents a refractive index of each layer.

When several pairs of layers having different refractive indices are laminated using Bragg reflection, a distributed Bragg reflector (DBR) having a high reflectivity for light having a specific wavelength is generated.

The reflective layer 120 of the light emitting device 100 may be formed of such a DBR.

In this case, a refractive index of each layer may be adjusted as an alloy ratio of Al.

As illustrated in FIG. 18, a refractive index of an AlGaAs semiconductor may vary in accordance with a wavelength of light and a percentage of Al. For example, in a case in which a wavelength of light is 780 nm, a refractive index of an AlGaAs semiconductor is decreased as a percentage of Al is increased.

That is, when a percentage of Al is periodically changed in accordance with a position, a refractive index of an AlGaAs semiconductor may be periodically changed in accordance with a position, and a DBR may be generated.

A specific example of the reflective layer 120 will be described below.

FIG. 19 illustrates an example of a reflective layer included in the light emitting device according to an example. FIG. 20 illustrates a reflectivity of the reflective layer illustrated in FIG. 19.

As illustrated in FIG. 19, a reflective layer 121 may include a plurality of sub-reflective layers 121-1, 121-2, ... 121-n. The sub-reflective layers 121-1, 121-2, ... 121-n may respectively include low refractive index layers 121-1a, 121-2a, ... 121-na and high refractive index layers 121-1b, 121-2b, ... 121-nb. Therefore, throughout the reflective layer 12, the low refractive index layers 121-1a, 121-2a, ... 121-na and the high refractive index layers 121-1b, 121-2b, ... 121-nb are repeated.

A thickness da of the low refractive index layers 121-1a, 121-2a, ... 121-na and a thickness db of the high refractive index layers 121-1b, 121-2b, ... 121-nb may be different from each other, and the thickness da of the low refractive index layers 121-1a, 121-2a, ... 121-na and the thickness db of the high refractive index layers 121-1b, 121-2b, ... 121-nb are constant throughout the reflective layer 121.

A refractive index index_a of the low refractive index layers 121-1a, 121-2a, ... 121-na and a refractive index index_b of the high refractive index layers 121-1b, 121-2b, ... 121-nb may be different from each other, and the refractive index index_a of the low refractive index layers 121-1a, 121-2a, ... 121-na and the refractive index index_b of the high refractive index layers 121-1b, 121-2b, ... 121-nb are constant throughout the reflective layer 121.

In this case, the thickness da and the refractive index index_a of the low refractive index layers 121-1a, 121-2a, ... 121-na and the thickness db and the refractive index index_b of the high refractive index layers 121-1b, 121-2b, ... 121-nb may be set by a target wavelength.

For example, in a case in which the reflective layer 121 is an AlGaAs semiconductor, the low refractive index layers 121-1a, 121-2a, ... 121-na may be an $Al_{90}Ga_{10}As$ semiconductor in which an Al:Ga ratio is 90:10, and the high refractive index layers 121-1b, 121-2b, ... 121-nb may be an $Al_{23}Ga_{77}As$ semiconductor in which an Al:Ga ratio is 23:77. A portion other than the reflective layer 121 may be an $Al_{35}Ga_{65}As$ semiconductor in which an Al:Ga ratio is 35:65.

In a case in which the target wavelength is 780 nm, referring to FIG. 18, for light whose wavelength is close to 780 nm, the refractive index index_a of the $Al_{90}Ga_{10}As$ semiconductor, in which an Al:Ga ratio is 90:10, is about 3.09, and the refractive index index_b of the $Al_{23}Ga_{77}As$ semiconductor, in which an Al:Ga ratio is 23:77, is about 3.49. A refractive index index_0 of an $Al_{35}Ga_{65}As$ semiconductor, in which an Al:Ga ratio is 35:65, is about 3.4.

According to [Equation 1], in a case in which a refractive index is 3.09 for light whose wavelength is 780 nm, a thickness for the Bragg reflection phenomenon to occur is about 63.7 nm. Therefore, the thickness da of the $Al_{90}Ga_{10}As$ semiconductor forming the low refractive index layers 121-1a, 121-2a, ... 121-na is about 63.7 nm.

In a case in which a refractive index is 3.49 for light whose wavelength is 780 nm, a thickness for the Bragg reflection phenomenon to occur is about 56.0 nm. Therefore, the thickness db of the $Al_{23}Ga_{77}As$ semiconductor forming the high refractive index layers 121-1b, 121-2b, ... 121-nb is about 56.0 nm.

As a result, in the reflective layer 121, the low refractive index layers 121-1a, 121-2a, ... 121-na whose refractive index index_a is about 3.09 and whose thickness da is about 63.7 nm and the high refractive index layers 121-1b, 121-2b, ... 121-nb whose refractive index index_b is about 3.49 and whose thickness db is about 56.0 nm may be repeated.

All of the sub-reflective layers 121-1, 121-2, ... 121-n including the low refractive index layers 121-1a, 121-2a, ... 121-na and the high refractive index layers 121-1b, 121-2b, ... 121-nb may reflect light having the same wavelength.

The reflectivity of the reflective layer 121 in accordance with a wavelength of light and an incident angle of light is shown in FIG. 20. Specifically, FIG. 20 illustrates a reflectivity of a reflective layer 121 including twelve low refractive index layers 121-1a, 121-2a, . . . 121-na and twelve high refractive index layers 121-1b, 121-2b, . . . 121-nb. In this case, the low refractive index layers 121-1a, 121-2a, . . . 121-na may be formed of an $Al_{90}Ga_{10}As$ semiconductor having a thickness of about 63.7 nm, and the high refractive index layers 121-1b, 121-2b, . . . 121-nb may be formed of an $Al_{23}Ga_{77}As$ semiconductor having a thickness of about 56.0 nm.

Referring to FIG. 20, in a case of light having a wavelength of 780 nm, the reflectivity of the reflective layer 121 is 80% or higher at most incident angles. However, when an incident angle exceeds 12°, the reflectivity of the reflective layer 121 is decreased as the incident angle is increased, and in a case in which an incident angle is about 15°, the reflectivity of the reflective layer 121 is about 70%.

However, in a case of light having a wavelength of 800 nm, although the reflectivity of the reflective layer 121 is about 80% or higher in a case in which an incident angle is 0°, the reflectivity of the reflective layer 121 is decreased as an incident angle is increased, and the reflectivity of the reflective layer 121 is decreased to about 70% in a case in which an incident angle is about 10°. Particularly, when an incident angle exceeds 10°, the reflectivity is decreased sharply, and when an incident angle is 16°, the reflectivity is decreased to be close to about 30%.

Thus, in a case in which the respective refractive indices index_a and index_b and the respective thicknesses da and db of the low refractive index layers 121-1a, 121-2a, . . . 121-na and the high low refractive index layers 121-1b, 121-2b, . . . 121-nb are constant, although the reflective layer 121 has a reflectivity of 80% or higher for light having a specific wavelength (in the above-mentioned example, light having a wavelength of 780 nm), the reflectivity is decreased for light having a larger wavelength (in the above example, light having a wavelength of 800 nm).

In other words, a range of wavelengths having a high reflectivity is narrow for the reflective layer 121 including the plurality of sub-reflective layers 121-1, 121-2, . . . 121-n having constant refractive indices index_a and index_b and constant thicknesses da and db.

FIG. 21 illustrates another example of a reflective layer included in a light emitting device according to an example. FIG. 22 illustrates a reflectivity of the reflective layer illustrated in FIG. 21.

As illustrated in FIG. 21, a reflective layer 122 may include a plurality of sub-reflective layers 122-1, 122-2, . . . 122-n. Each of the sub-reflective layers 122-1, 122-2, . . . 122-n may include low refractive index layers 122-1a, 122-2a, . . . 122-na and high refractive index layers 122-1b, 122-2b, . . . 122-nb. Therefore, throughout the reflective layer 122, the low refractive index layers 122-1a, 122-2a, . . . 122-na and the high refractive index layers 122-1b, 122-2b, . . . 122-nb are repeated.

A refractive index index_a of the low refractive index layers 122-1a, 122-2a, . . . 122-na and a refractive index index_b of the high refractive index layers 122-1b, 122-2b, . . . 122-nb may be different from each other, and the refractive index index_a of the low refractive index layers 122-1a, 122-2a, . . . 122-na and the refractive index index_b of the high refractive index layers 122-1b, 122-2b, . . . 122-nb may be constant throughout the reflective layer 121.

Thicknesses da1, da2, . . . dan of the low refractive index layers 122-1a, 122-2a, . . . 122-na and thicknesses db1, db2, . . . dbn of the high refractive index layers 122-1b, 122-2b, . . . 122-nb may be different from each other, and the thicknesses da1, da2, . . . dan of the low refractive index layers 122-1a, 122-2a, . . . 122-na and the thicknesses db1, db2, . . . dbn of the high refractive index layers 122-1b, 122-2b, . . . 122-nb may be changed within the reflective layer 122.

In this case, the thicknesses da1, da2, . . . dan of the low refractive index layers 122-1a, 122-2a, . . . 122-na and the thicknesses db1, db2, . . . dbn of the high refractive index layers 122-1b, 122-2b, . . . 122-nb may be changed in accordance with a target wavelength range.

For example, in a case in which the reflective layer 122 is an AlGaAs semiconductor, the low refractive index layers 122-1a, 122-2a, . . . 122-na may be an $Al_{90}Ga_{10}As$ semiconductor in which an Al:Ga ratio is 90:10, and the high refractive index layers 122-1b, 122-2b, . . . 122-nb may be an $Al_{90}Ga_{10}As$ semiconductor in which an Al:Ga ratio is 23:77. A portion other than the reflective layer 122 may be an $Al_{35}Ga_{65}As$ semiconductor in which an Al:Ga ratio is 35:65.

In a case in which the target wavelength range is 780 nm to 800 nm, referring to FIG. 18, the refractive index index_a of the $Al_{90}Ga_{10}As$ semiconductor, in which an Al:Ga ratio is 90:10, is about 3.09, and the refractive index index_b of the $Al_{23}Ga_{77}As$ semiconductor, in which an Al:Ga ratio is 23:77, is about 3.49. A refractive index index_0 of an $Al_{35}Ga_{65}As$ semiconductor, in which an Al:Ga ratio is 35:65, is about 3.4.

According to [Equation 1], in a case in which a refractive index is 3.09 for light whose wavelength is 780 nm, a thickness for the Bragg reflection phenomenon to occur is about 63.7 nm. Therefore, a thickness da1 of the $Al_{90}Ga_{10}As$ semiconductor forming a first low refractive index layer 122-1a is about 63.7 nm.

In a case in which a refractive index is 3.09 for light whose wavelength is 800 nm, a thickness for the Bragg reflection phenomenon to occur is about 65.4 nm. Therefore, a thickness dan of the $Al_{90}Ga_{10}As$ semiconductor forming an n-th low refractive index layer 122-na is about 65.4 nm.

Therefore, the thicknesses da1, da2, . . . dan of the low refractive index layers 122-1a, 122-2a, . . . 122-na may be gradually changed from about 63.7 nm to about 65.4 nm.

In a case in which a refractive index is 3.49 for light whose wavelength is 780 nm, a thickness for the Bragg reflection phenomenon to occur is about 56.0 nm. Therefore, a thickness db1 of the $Al_{23}Ga_{77}As$ semiconductor forming a first high refractive index layer 122-1b is about 56.0 nm.

In a case in which a refractive index is 3.49 for light whose wavelength is 800 nm, a thickness for the Bragg reflection phenomenon to occur is about 57.8 nm. Therefore, a thickness dan of the $Al_{23}Ga_{77}As$ semiconductor forming an n-th low refractive index layer 122-nb is about 57.8 nm.

Therefore, the thicknesses db1, db2, . . . dbn of the high refractive index layers 122-1b, 122-2b, . . . 122-nb may be gradually changed from about 56.0 nm to about 57.8 nm.

The sub-reflective layers 122-1, 122-2, . . . 122-n including the low refractive index layers 122-1a, 122-2a, . . . 122-na and the high refractive index layers 122-1b, 122-2b, . . . 122-nb may reflect light rays having different wavelengths.

Although a case in which the thicknesses da1, da2, . . . dan of the low refractive index layers 122-1a, 122-2a, . . . 122-na and the thicknesses db1, db2, . . . dbn of the high refractive index layers 122-1b, 122-2b, . . . 122-nb are gradually increased from top to bottom has been described above as an example, present disclosure is not limited thereto. For example, the thicknesses da1, da2, . . . dan of the low refractive index layers 122-1a, 122-2a, . . . 122-na and the thicknesses db1, db2, . . . dbn of the high refractive index layers 122-1b, 122-2b, . . . 122-nb may be gradually decreased from top to bottom.

The reflectivity of the reflective layer 122 in accordance with a wavelength of light and an incident angle of light is shown in FIG. 22. Specifically, FIG. 22 illustrates a reflectivity of a reflective layer 122 including twelve low refractive index layers 122-1a, 122-2a, . . . 122-na and twelve high refractive index layers 122-1b, 122-2b, 122-nb. In this case, the low refractive index layers 122-1a, 122-2a, . . . 122-na may be formed of an $Al_{90}Ga_{10}As$ semiconductor having a thickness in the range of about 63.7 nm to about 65.4 nm, and the high refractive index layers 122-1b, 122-2b, 122-nb may be formed of an $Al_{23}Ga_{77}As$ semiconductor having a thickness in the range of about 56.0 nm to about 57.8 nm.

Referring to FIG. 22, in a case of light having a wavelength of 780 nm, the reflectivity of the reflective layer 121 is 80% or higher at an incident angle in the range of 0° to 16°.

In a case of light having a wavelength of 800 nm, the reflectivity is 80% at an incident angle in the range of 0° to 10°. Although the reflectivity is decreased when the incident angle exceeds 10°, the reflectivity is maintained at about 60% in a case in which the incident angle is about 16°.

Thus, in a case in which the thicknesses of the low refractive index layers 122-1a, 122-2a, . . . 122-na and the high refractive index layers 122-1b, 122-2b, 122-nb included in the reflective layer 122 are changed, the reflective layer 122 may maintain a high reflectivity in a predetermined wavelength range. In other words, the reflective layer 122 including the plurality of sub-reflective layers 122-1, 122-2, . . . 122-n whose thicknesses are changed may exhibit a high reflectivity in a wide wavelength range.

Particularly, comparing FIGS. 20 and 22, for light having a wavelength of 800 nm, a reflectivity is improved in a wider wavelength range in the reflective layer 122, in which the thicknesses of the plurality of sub-reflective layers 122-1, 122-2, . . . 122-n are changed, in comparison to the reflective layer 121, in which the thicknesses of the plurality of sub-reflective layers 121-1, 121-2, . . . 121-n are constant.

FIG. 23 illustrates still another example of a reflective layer included in a light emitting device according to an example. FIG. 24 illustrates a reflectivity of the reflective layer illustrated in FIG. 23.

As illustrated in FIG. 23, a reflective layer 123 may include a plurality of sub-reflective layers 123-1, 123-2, . . . 123-n. Each of the sub-reflective layers 123-1, 123-2, . . . 123-n may include low refractive index layers 123-1a, 123-2a, . . . 123-na and high refractive index layers 123-1b, 123-2b, 123-nb. Therefore, throughout the reflective layer 123, the low refractive index layers 123-1a, 123-2a, . . . 123-na and the high refractive index layers 123-1b, 123-2b, 123-nb are repeated.

A thickness da of the low refractive index layers 123-1a, 123-2a, . . . 123-na and a thickness db of the high refractive index layers 123-1b, 123-2b, 123-nb may be different from each other, and each of the thickness da of the low refractive index layers 123-1a, 123-2a, . . . 123-na and the thickness db of the high refractive index layers 123-1b, 123-2b, . . . 123-nb is constant within the reflective layer 123.

Refractive indices index_a1, index_a2, . . . index_an of the low refractive index layers 123-1a, 123-2a, . . . 123-na and refractive indices index_b1, index_b2, . . . index_bn of the high refractive index layers 123-1b, 123-2b, . . . 123-nb may be different from each other, and the refractive indices index_a1, index_a2, . . . index_an of the low refractive index layers 123-1a, 123-2a, . . . 123-na and the refractive indices index_b1, index_b2, . . . index_bn of the high refractive index layers 123-1b, 123-2b, . . . 123-nb may be changed within the reflective layer 123.

In this case, the refractive indices index_a1, index_a2, . . . index_an of the low refractive index layers 123-1a, 123-2a, . . . 123-na and the refractive indices index_b1, index_b2, . . . index_bn of the high refractive index layers 123-1b, 123-2b, . . . 123-nb may be changed in accordance with a target wavelength range.

For example, in a case in which the reflective layer 123 is an AlGaAs semiconductor, a first low refractive index layers 123-1a may be an $Al_{90}Ga_{10}As$ semiconductor in which an Al:Ga ratio is 90:10, and a first high refractive index layer 122-1b may be an $Al_{23}Ga_{77}As$ semiconductor in which an Al:Ga ratio is 23:77. A portion other than the reflective layer 123 may be an $Al_{35}Ga_{65}As$ semiconductor in which an Al:Ga ratio is 35:65.

In a case in which the target wavelength range is 780 nm to 800 nm, referring to FIG. 18, the refractive index index_a of the $Al_{90}Ga_{10}As$ semiconductor, in which an Al:Ga ratio is 90:10, is about 3.09, and the refractive index index_b of the $Al_{23}Ga_{77}As$ semiconductor, in which an Al:Ga ratio is 23:77, is about 3.49. A refractive index index_0 of an $Al_{35}Ga_{65}As$ semiconductor, in which an Al:Ga ratio is 35:65, is about 3.4.

According to [Equation 1], in a case in which a refractive index is 3.09 for light whose wavelength is 780 nm, a thickness for the Bragg reflection phenomenon to occur is about 63.7 nm. Therefore, a thickness da1 of the $Al_{90}Ga_{10}As$ semiconductor forming the first low refractive index layer 123-1a is about 63.7 nm.

In a case in which a thickness is about 63.7 nm for light whose wavelength is 800 nm, a refractive index for the Bragg reflection phenomenon to occur is about 3.2. Therefore, a refractive index index_an of an n-th low refractive index layer 123-an is 3.2. Referring to FIG. 18, for light having a wavelength of 800 nm, an Al:Ga ratio when a refractive index is 3.2 is about 80:20. Therefore, the n-th low refractive index layer 123-an is formed of an $Al_{80}Ga_{20}As$ semiconductor, in which an Al:Ga ratio is 80:20.

Therefore, the refractive indices index_a1, index_a2, index_an of the low refractive index layers 123-1a, 123-2a, . . . 123-na may be gradually changed from about 3.09 to about 3.2, and a percentage of Al in an AlGaAs semiconductor forming the low refractive index layers 123-1a, 123-2a, . . . 123-na may be gradually changed from 90% to 80%.

In a case in which a refractive index is 3.49 for light whose wavelength is 780 nm, a thickness for the Bragg reflection phenomenon to occur is about 56.0 nm. Therefore, a thickness db1 of the $Al_{23}Ga_{77}As$ semiconductor forming the first high refractive index layer 123-1b is about 56.0 nm.

In a case in which a thickness is about 56.0 nm for light whose wavelength is 800 nm, a refractive index for the Bragg reflection phenomenon to occur is about 3.497. Therefore, a refractive index index_bn of an n-th low refractive index layer 123-bn is 3.497. Referring to FIG. 18, for light having a wavelength of 800 nm, an Al:Ga ratio when a refractive index is 3.497 is about 15:85. Therefore, the n-th high refractive index layer 123-bn is formed of an $Al_{15}Ga_{85}As$ semiconductor, in which an Al:Ga ratio is 15:85.

Therefore, the refractive indices index_b1, index_b2, index_bn of the high refractive index layers 123-1b, 123-2b, 123-nb may be gradually changed from about 3.49 to about 3.497, and a percentage of Al in an AlGaAs semiconductor forming the high refractive index layers 123-1b, 123-2b, 123-nb may be gradually changed from 23% to 15%.

The sub-reflective layers 123-1, 123-2, . . . 123-n including the low refractive index layers 123-1a, 123-2a, . . . 123-na and the high refractive index layers 122-1b, 123-2b, 123-nb may reflect light rays having different wavelengths.

Although a case in which the refractive indices index_a1, index_a2, index_an of the low refractive index layers 123-1a, 123-2a, . . . 123-na and the refractive indices index_b1, index_b2, index_bn of the high refractive index layers 123-1b, 123-2b, 123-nb are gradually increased from top to bottom has been described above as an example, present disclosure is not limited thereto. For example, the refractive indices index_a1, index_a2, index_an of the low refractive index layers 123-1a, 123-2a, 123-na and the refractive indices index_b1, index_b2, index_bn of the high refractive index layers 123-1b, 123-2b, 123-nb may be gradually decreased from top to bottom.

The reflectivity of the reflective layer 123 in accordance with a wavelength of light and an incident angle of light is shown in FIG. 24. Specifically, FIG. 24 illustrates a reflectivity of a reflective layer 123 including twelve low refractive index layers 123-1a, 123-2a, . . . 123-na and twelve high refractive index layers 123-1b, 123-2b, 123-nb. In this case, the low refractive index layers 123-1a, 123-2a, . . . 123-na may be formed of an AlGaAs semiconductor having a refractive index in the range of about 3.09 to about 3.2, and the high refractive index layers 122-1b, 122-2b, . . . 122-nb may be formed of an AlGaAs semiconductor having a refractive index in the range of about 3.49 to about 3.497.

Referring to FIG. 24, in a case of light having a wavelength of 780 nm, the reflectivity of the reflective layer 123 is 80% or higher at an incident angle in the range of 0° to 16°.

In a case of light having a wavelength of 800 nm, the reflectivity is 80% at an incident angle in the range of 0° to 10°. Although the reflectivity is decreased when the incident angle exceeds 10°, the reflectivity is maintained at about 60% in a case in which the incident angle is about 16°.

Thus, in a case in which the refractive indices of the low refractive index layers 122-1a, 122-2a, . . . 122-na and the high refractive index layers 122-1b, 122-2b, . . . 122-nb included in the reflective layer 123 are changed, the reflective layer 122 may maintain a high reflectivity in a predetermined wavelength range. In other words, the reflective layer 122 including the plurality of sub-reflective layers 122-1, 122-2, . . . 122-n whose refractive indices are changed may exhibit a high reflectivity in a wide wavelength range.

Particularly, comparing FIGS. 20 and 24, for light having a wavelength of 800 nm, a reflectivity is improved in a wider wavelength range in the reflective layer 123, in which the refractive indices of the plurality of sub-reflective layers 123-1, 123-2, . . . 123-n are changed, in comparison to the reflective layer 121, in which the refractive indices of the plurality of sub-reflective layers 121-1, 121-2, . . . 121-n are constant.

FIG. 25 illustrates yet another example of a reflective layer included in a light emitting device according to an example. FIG. 26 illustrates a reflectivity of the reflective layer illustrated in FIG. 25.

As illustrated in FIG. 25, reflective layers 124 and 125 may include a first reflective layer 124 and a second reflective layer 125. In other words, while the above-described reflective layers 121, 122, and 123 include a plurality of sub-reflective layers whose thicknesses and refractive indices are constant, whose refractive indices are constant, or whose thicknesses are constant, the reflective layers 124 and 125 illustrated in FIG. 25 include the first reflective layer 124 and the second reflective layer 125 whose thicknesses and refractive indices are different.

The first reflective layer 124 may include a plurality of sub-reflective layers 124-1, 124-2, . . . 124-n. Each of the sub-reflective layers 124-1, 124-2, . . . 124-n may include low refractive index layers 124-1a, 124-2a, . . . 124-na and high refractive index layers 124-1b, 124-2b, . . . 124-nb. Therefore, throughout the first reflective layer 124, the low refractive index layers 124-1a, 124-2a, . . . 124-na and the high refractive index layers 124-1b, 124-2b, . . . 124-nb are repeated.

A refractive index index_a of the low refractive index layers 124-1a, 124-2a, . . . 124-na and a refractive index index_b of the high refractive index layers 124-1b, 124-2b, . . . 124-nb may be different from each other, and the refractive index index_a of the low refractive index layers 124-1a, 124-2a, . . . 124-na and the refractive index index_b of the high refractive index layers 124-1b, 124-2b, . . . 124-nb may be constant throughout the first reflective layer 124.

A thickness da of the low refractive index layers 124-1a, 124-2a, . . . 124-na and a thickness db of the high refractive index layers 124-1b, 124-2b, . . . 124-nb may be different from each other, and each of the thickness da of the low refractive index layers 124-1a, 124-2a, . . . 124-na and the thickness db of the high refractive index layers 124-1b, 124-2b, . . . 124-nb may be constant within the first reflective layer 124.

In this case, the thickness da of the low refractive index layers 124-1a, 124-2a, . . . 124-na and the thickness db of the high refractive index layers 124-1b, 124-2b, . . . 124-nb may be changed in accordance with a target wavelength.

For example, in a case in which the first reflective layer 124 is an AlGaAs semiconductor, the low refractive index layers 124-1a, 124-2a, . . . 124-na may be an $Al_{90}Ga_{10}As$ semiconductor in which an Al:Ga ratio is 90:10, and high refractive index layers 124-1b, 124-2b, . . . 124-nb may be an $Al_{23}Ga_{77}As$ semiconductor in which an Al:Ga ratio is 23:77. A portion other than the reflective layers 124 and 125 may be an $Al_{35}Ga_{65}As$ semiconductor in which an Al:Ga ratio is 35:65.

In a case in which the target wavelength is 780 nm, referring to FIG. 18, the refractive index index_a of the $Al_{90}Ga_{10}As$ semiconductor, in which an Al:Ga ratio is 90:10, is about 3.09, and the refractive index index_b of the $Al_{23}Ga_{77}As$ semiconductor, in which an Al:Ga ratio is 23:77, is about 3.49. A refractive index index_0 of an $Al_{35}Ga_{65}As$ semiconductor, in which an Al:Ga ratio is 35:65, is about 3.4.

According to [Equation 1], in a case in which a refractive index is 3.09 for light whose wavelength is 780 nm, a thickness for the Bragg reflection phenomenon to occur is about 63.7 nm. Therefore, the thickness da of the $Al_{90}Ga_{10}As$ semiconductor forming the low refractive index layers 124-1a, 124-2a, . . . 124-na is about 63.7 nm.

In a case in which a refractive index is 3.49 for light whose wavelength is 780 nm, a thickness for the Bragg reflection phenomenon to occur is about 56.0 nm. Therefore, the thickness db of the $Al_{23}Ga_{77}As$ semiconductor forming the high refractive index layers 124-1b, 124-2b, . . . 124-nb is about 56.0 nm.

The second reflective layer 125 may also include a plurality of sub-reflective layers 125-1, 125-2, . . . 125-n. Each of the sub-reflective layers 125-1, 125-2, . . . 125-n may include low refractive index layers 125-1a, 125-2a, . . . 125-na and high refractive index layers 125-1b, 125-2b, 125-nb. Therefore, throughout the second reflective layer 125, the low refractive index layers 125-1a, 125-2a, . . . 125-na and the high refractive index layers 125-1b, 125-2b, 125-nb are repeated.

A refractive index index_a' of the low refractive index layers 125-1a, 125-2a, . . . 125-na and a refractive index index_b' of the high refractive index layers 125-1b, 125-2b, 125-nb may be different from each other, and the refractive index index_a' of the low refractive index layers 125-1a, 125-2a, . . . 125-na and the refractive index index_b' of the high refractive index layers 125-1b, 125-2b, 125-nb may be constant throughout the second reflective layer 125.

A thickness da' of the low refractive index layers 125-1a, 125-2a, . . . 125-na and a thickness db' of the high refractive index layers 125-1b, 125-2b, 125-nb may be different from each other, and each of the thickness da' of the low refractive index layers 125-1a, 125-2a, . . . 125-na and the thickness db' of the high refractive index layers 125-1b, 125-2b, 125-nb may be constant within the second reflective layer 125.

In this case, the thickness da' of the low refractive index layers 125-1a, 125-2a, . . . 125-na and the thickness db' of the high refractive index layers 125-1b, 125-2b, 125-nb may be changed in accordance with a target wavelength.

For example, in a case in which the second reflective layer 125 is an AlGaAs semiconductor, the low refractive index layers 125-1a, 125-2a, . . . 125-na may be an AlAs semiconductor, and the high refractive index layers 125-1b, 125-2b, 125-nb may be an $Al_{16}Ga_{84}As$ semiconductor in which an Al:Ga ratio is 16:84. A portion other than the reflective layers 125 and 125 may be an $Al_{35}Ga_{65}As$ semiconductor in which an Al:Ga ratio is 35:65.

In a case in which the target wavelength is 780 nm, referring to FIG. 18, the refractive index index_a' of the AlAs semiconductor is about 3.05, and the refractive index index_b' of the $Al_{16}Ga_{84}As$ semiconductor, in which an Al:Ga ratio is 16:84, is about 3.55. A refractive index index_0 of an $Al_{35}Ga_{65}As$ semiconductor, in which an Al:Ga ratio is 35:65, is about 3.4.

According to [Equation 1], in a case in which a refractive index is 3.05 for light whose wavelength is 780 nm, a thickness for the Bragg reflection phenomenon to occur is about 64.7 nm. Therefore, the thickness da' of the AlAs semiconductor forming the low refractive index layers 125-1a, 125-2a, . . . 125-na may be about 64.7 nm.

In a case in which a refractive index is 3.55 for light whose wavelength is 780 nm, a thickness for the Bragg reflection phenomenon to occur is about 55.1 nm. Therefore, the thickness db' of the $Al_{16}Ga_{84}As$ semiconductor forming the high refractive index layers 125-1b, 125-2b, . . . 125-nb may be about 55.1 nm.

The reflectivity of the reflective layer 123 in accordance with a wavelength of light and an incident angle of light is shown in FIG. 26. Specifically, FIG. 26 illustrates a reflectivity of reflective layers 124 and 125 including a first reflective layer 124 and a second reflective layer 125. In this case, the first reflective layer 124 may include six low refractive index layers 124-1a, 124-2a, . . . 124-na and six high refractive index layers 124-1b, 124-2b, . . . 124-nb, the low refractive index layers 124-1a, 124-2a, . . . 124-na may be formed of an $Al_{90}Ga_{10}As$ semiconductor having a thickness of about 63.7 nm, and the high refractive index layers 124-1b, 124-2b, . . . 124-nb may be formed of an $Al_{23}Ga_{77}As$ semiconductor having a thickness of about 56.0 nm. The second reflective layer 125 may also include six low refractive index layers 125-1a, 125-2a, . . . 125-na and six high refractive index layers 125-1b, 125-2b, . . . 125-nb, the low refractive index layers 125-1a, 125-2a, . . . 125-na may be formed of an AlAs semiconductor having a thickness of about 64.7 nm, and the high refractive index layers 125-1b, 125-2b, . . . 125-nb may be formed of an $Al_{16}Ga_{84}As$ semiconductor having a thickness of about 55.1 nm.

Referring to FIG. 26, in a case of light having a wavelength of 780 nm, the reflectivity of the reflective layer 123 is 80% or higher at an incident angle in the range of 0° to 16°.

In a case of light having a wavelength of 800 nm, the reflectivity is 80% at an incident angle in the range of 0° to 12°. Although the reflectivity is decreased when the incident angle exceeds 12°, the reflectivity is maintained at about 70% in a case in which the incident angle is about 16°.

Thus, the reflective layers 125 including the first reflective layer 124 and the second reflective layer 125 having different thicknesses and refractive indices may maintain a high reflectivity in a predetermined wavelength range.

Particularly, comparing FIGS. 20 and 26, a reflectivity is improved in a wider wavelength range in the reflective layers 125 including the first reflective layer 124 and the second reflective layer 125 having different thicknesses and refractive indices, in comparison to the reflective layer 121 having a constant thickness and a constant refractive index.

As described above, a reflective layer including a plurality of sub-reflective layers, in which thicknesses or refractive indices are changed, and a plurality of reflective layers having different thicknesses and refractive indices may exhibit a high reflectivity in a wide wavelength range.

FIG. 27 illustrates a side cross-sectional view of a light emitting device according to another example.

As illustrated in FIG. 27, a light emitting device 200 has a thyristor structure, fundamentally based on a p-n-p-n diode structure, in which a gate terminal is connected to a p-type semiconductor between two n-type semiconductors.

The light emitting device 200 may include a light emitting layer 210 configured to transmit light, a reflective layer 220 configured to reflect light, and a substrate 230 configured to support the light emitting device 200.

The light emitting device 200 may be formed of various semiconductor materials. For example, a direct-type semiconductor such as GaAs, GaN, and InAs may be used. Particularly, GaAs has an energy band gap of about 1.43 [eV], and may emit light substantially close to infrared light. AlGaAs in which Al is mixed with GaAs may have an optical characteristic that varies in accordance with a mixing percentage of Al.

Hereinafter, the light emitting device 200 will be assumed as being formed of GaAs or AlGaAs.

The substrate 230 of the light emitting device 200 may be formed of an intrinsic GaAs semiconductor in which impurities are not mixed, or may be formed of a p-type GaAs semiconductor in which p-type impurities such as Zn (acceptors) are mixed.

By growing an epitaxial layer on a substrate Sub formed of an intrinsic semiconductor or a p-type semiconductor, a p-n-p-n diode structure including the light emitting layer 210 and the reflective layer 220 may be formed.

The light emitting layer 210 may include a first p-type semiconductor layer 211, a first n-type semiconductor layer 212, a second p-type semiconductor layer 213, and a third n-type semiconductor layer 214, and the first p-type semiconductor layer 211, the first n-type semiconductor layer 212, the second p-type semiconductor layer 213, and the second n-type semiconductor layer 214 may be sequentially laminated in that order.

Although the reflective layer 220 is formed inside the first p-type semiconductor layer 211 of the light emitting layer

210, the reflective layer 220 will be separately described to assist understanding. The reflective layer 220 may reflect light emitted toward the substrate 230, and may include a Bragg mirror using Bragg reflection. Specifically, a plurality of low refractive index layers 220-1a, 220-2a, . . . 220-na and a plurality of high refractive index layers 220-1b, 220-2b, . . . 220-nb may be alternately disposed in the reflective layer 220.

In this case, each of the first p-type semiconductor layer 211, the first n-type semiconductor layer 212, the second p-type semiconductor layer 213, and the second n-type semiconductor layer 214 constituting the light emitting device 200 may be an AlGaAs semiconductor in which Al is mixed with GaAs. Mixing percentages of Al of the first p-type semiconductor layer 211, the first n-type semiconductor layer 212, the second p-type semiconductor layer 213, and the third n-type semiconductor layer 214 may be different from each other. By adjusting the mixing percentages of Al of the first p-type semiconductor layer 211, the first n-type semiconductor layer 212, the second p-type semiconductor layer 213, and the second n-type semiconductor layer 214, light may be transmitted from the first n-type semiconductor layer 212.

Light generated in the light emitting layer 210 passes through the second n-type semiconductor layer 214 and is emitted to the atmosphere. In this case, there is an extremely large difference between a refractive index of the second n-type semiconductor layer 214 and a refractive index of air. For example, in a case in which the second n-type semiconductor layer 214 is formed of an $Al_{25}Ga_{75}As$ semiconductor, a refractive index of air is about 1.00 while a refractive index of the second n-type semiconductor layer 214 is about 3.52.

Due to such a difference in refractive indices between the second n-type semiconductor layer 214 and the air, a majority of light emitted from the second n-type semiconductor layer 214 to the air is entirely reflected to the inside of the second n-type semiconductor layer 214. As a result, light efficiency of the light emitting device 200 may be decreased.

To prevent a total reflection phenomenon at a surface 214a of the second n-type semiconductor layer 214, as illustrated in FIG. 27, the surface 214a of the second n-type semiconductor layer 214 is formed of a concave-convex structure as illustrated in FIG. 27.

The concave-convex structure of the surface 214a of the second n-type semiconductor layer 214 may have various shapes.

For example, as illustrated in FIG. 27, the concave-convex structure of the surface 214a of the second n-type semiconductor layer 214 may be formed of a plurality of semi-spherical protrusions 214b. Furthermore, the concave-convex structure of the surface 214a of the second n-type semiconductor layer 214 may be formed of conical protrusions or polypyramidal protrusions.

In addition to being formed of protrusions, the concave-convex structure of the surface 214a of the second n-type semiconductor layer 214 may also be formed of stripes. For example, the concave-convex structure of the surface 214a of the second n-type semiconductor layer 214 may be formed of semi-circular columns arranged in a row or formed of triangular prisms arranged in a row.

The concave-convex structure of the surface 214a of the second n-type semiconductor layer 214 may be regularly formed or irregularly formed.

The concave-convex structure of the surface 214a of the second n-type semiconductor layer 214 may be formed by growing an epitaxial layer for forming the second n-type semiconductor layer 214 and then performing a photolithography process and an etching process (dry-etching or wet-etching).

Specifically, a photoresistor may be applied on the surface 214a of the second n-type semiconductor layer 214, the surface 214a of the second n-type semiconductor layer 214 may be covered with a mask on which a pattern corresponding to a concave-convex structure is formed, and then an exposure process may be performed using ultraviolet rays or electron beams (EB). Then, the exposed photoresistor may be removed through a development process, and an etching process may be performed. Then, when the photoresistor remaining on the surface 214a of the second n-type semiconductor layer 214 is removed, the concave-convex structure is formed on the surface 214a of the second n-type semiconductor layer 214.

Due to such a concave-convex structure, the total reflection phenomenon between the second n-type semiconductor layer 214 and the air may be reduced. In other words, due to the concave-convex structure of the surface 214a of the second n-type semiconductor layer 214, a percentage of light passing through the surface 214a of the second n-type semiconductor layer 214 at an incident angle larger than a critical angle for total reflection may be decreased.

Although it has been described above that a concave-convex structure is formed on the surface 214a of the second n-type semiconductor layer 214 to prevent the total reflection phenomenon between the second n-type semiconductor layer 214 and the air, present disclosure is not limited thereto. For example, a buffer material whose refractive index is between the refractive indices of AlGaAs and air may be applied on the second n-type semiconductor layer 214.

By forming a concave-convex structure on a light-emitting surface of the light emitting device 200 as described above, light extraction efficiency of the light emitting device 200 may be improved.

FIG. 28 illustrates a side cross-sectional view of a light emitting device according to still another example. FIG. 29 illustrates an enlarged view of a light emitting layer of the light emitting device according to still another example. FIGS. 30 and 31 illustrate energy band diagrams of the light emitting layer of the light emitting device according to still another example.

As illustrated in FIG. 28, a light emitting device 300 has a thyristor structure, fundamentally based on a p-n-p-n diode structure, in which a gate terminal is connected to a p-type semiconductor between two n-type semiconductors.

The light emitting device 300 may include a light emitting layer 310 configured to transmit light, a reflective layer 320 configured to reflect light, and a substrate 330 configured to support the light emitting device 300.

The light emitting device 300 may be formed of various semiconductor materials. For example, a direct-type semiconductor such as GaAs, GaN, and InAs may be used. Particularly, GaAs has an energy band gap of about 1.43 [eV], and may emit light substantially close to infrared light. AlGaAs in which Al is mixed with GaAs may have an optical characteristic that varies in accordance with a mixing percentage of Al.

Hereinafter, the light emitting device 300 will be assumed as being formed of GaAs or AlGaAs.

The substrate 330 of the light emitting device 300 may be formed of an intrinsic GaAs semiconductor in which impurities are not mixed, or may be formed of a p-type GaAs semiconductor in which p-type impurities such as Zn (acceptors) are mixed.

By growing an epitaxial layer on a substrate Sub formed of an intrinsic semiconductor or a p-type semiconductor, a p-n-p-n diode structure including the light emitting layer 310 and the reflective layer 320 may be generated.

The light emitting layer 310 may include a first p-type semiconductor layer 311, a first n-type semiconductor layer 312, a second p-type semiconductor layer 313, and a third n-type semiconductor layer 314, and the first p-type semiconductor layer 311, the first n-type semiconductor layer 312, the second p-type semiconductor layer 313, and the second n-type semiconductor layer 314 may be sequentially laminated in that order.

Although the reflective layer 320 is formed inside the first p-type semiconductor layer 311 of the light emitting layer 310, the reflective layer 320 will be separately described to assist understanding. The reflective layer 320 may reflect light emitted toward the substrate 330, and may include a Bragg mirror using Bragg reflection. Specifically, a plurality of low refractive index layers 320-1a, 320-2a, . . . 320-na and a plurality of high refractive index layers 320-1b, 320-2b, . . . 320-nb may be alternately disposed in the reflective layer 320.

In this case, each of the first p-type semiconductor layer 311, the first n-type semiconductor layer 312, the second p-type semiconductor layer 313, and the second n-type semiconductor layer 314 constituting the light emitting device 300 may be an AlGaAs semiconductor in which Al is mixed with GaAs. Mixing percentages of Al of the first p-type semiconductor layer 311, the first n-type semiconductor layer 312, the second p-type semiconductor layer 313, and the third n-type semiconductor layer 314 may be different from each other.

By adjusting the mixing percentages of Al of the first p-type semiconductor layer 311, the first n-type semiconductor layer 312, the second p-type semiconductor layer 313, and the second n-type semiconductor layer 314, light may be transmitted from the first n-type semiconductor layer 312.

Particularly, a quantum well layer 312a may be formed at the first n-type semiconductor layer 312 at which light emission frequently occurs.

A quantum well refers to a two-dimensional fine planar structure capable of restricting movement of electrons e− or positive holes h+. That is, electrons e− or positive holes h+ are restricted by a quantum well, and distributed within the quantum well in large numbers.

Particularly, the electrons e− or the positive holes h+ in the quantum well may only have energy at a specific level. In other words, an energy level of the quantum well is quantized.

Such a quantum well may be formed by an energy well W configured to hold electrons e− or positive holes h+ and an energy barrier B configured to hinder movement of the electrons e− or the positive holes h+.

A plurality of quantum wells may be formed in the quantum well layer 312a of the first n-type semiconductor layer 312.

For example, as illustrated in FIG. 29, the quantum well layer 312a may include a plurality of energy wells W1, W2, W3, and W4 and a plurality of energy barriers B1, B2, and B3.

Here, the energy wells W1, W2, W3, and W4 may be formed of a material having a small energy band gap, and the energy barriers B1, B2, and B3 may be formed of a material having a large energy band gap.

The quantum well layer 312a may be formed by alternately stacking layers formed of a material having a small energy band gap and layers formed of a material having a large energy band gap.

For example, the quantum well layer 312a may be formed by alternately stacking AlGaAs semiconductors in which percentages of Al are different.

As described above, an AlGaAs semiconductor has a different energy band gap in accordance with an Al:Ga ratio. Specifically, an energy band gap of an AlGaAs semiconductor is increased as a percentage of Al is increased.

Specifically, in a case in which a wavelength of light to be emitted is 780 nm, the energy wells W1, W2, W3, and W4 may be formed of an $Al_{13}Ga_{87}As$ semiconductor, in which an Al:Ga ratio is 13:87, and the energy barriers B1, B2, and B3 may be formed of an $Al_{15}Ga_{85}As$ semiconductor in which a percentage of Al is higher than 13%.

To form the energy wells W1, W2, W3, and W4, an Al:Ga ratio may be adjusted during an epitaxial process for forming the first n-type semiconductor layer 312.

Specifically, when a mixing percentage of Al is changed during the growth of the first n-type semiconductor layer 312, an n-type AlGaAs semiconductor, in which a mixing percentage of Al is changed in accordance with a position, is formed. For example, when an Al:Ga ratio is changed from 15:85 to 13:87 and reverted from 13:87 to 15:85 during the growth of the first n-type semiconductor layer 312, an $Al_{15}Ga_{85}As$ semiconductor layer, in which an Al:Ga ratio is 15:85, and an $Al_{13}Ga_{87}As$ semiconductor layer, in which an Al:Ga ratio is 13:87, may be formed in the first n-type semiconductor layer 312. When the Al:Ga ratio is repetitively changed, the $Al_{15}Ga_{85}As$ semiconductor layer, in which an Al:Ga ratio is 15:85, and the $Al_{13}Ga_{87}As$ semiconductor layer, in which an Al:Ga ratio is 13:87, may be repetitively formed in the first n-type semiconductor layer 312.

When the quantum well layer 312a is generated by such a method, as illustrated in FIG. 30, the plurality of energy wells W1, W2, W3, and W4 and the plurality of energy barriers B1, B2, and B3 may be formed in the first n-type semiconductor layer 312.

Since recombination between electrons e− and positive holes h+ frequently occurs in the vicinity of a boundary surface between the first n-type semiconductor layer 312 and the first p-type semiconductor layer 311, as illustrated in FIG. 28, the quantum well layer 312a may be formed in the vicinity of the boundary surface between the first n-type semiconductor layer 312 and the first p-type semiconductor layer 311.

In this case, thicknesses dw1, dw2, dw3, and dw4 of the plurality of energy wells W1, W2, W3, and W4 may be different from each other. For example, as illustrated in FIG. 29, the thicknesses dw1, dw2, dw3, and dw4 of the plurality of energy wells W1, W2, W3, and W4 may be increased closer toward the boundary between the first n-type semiconductor layer 312 and the first p-type semiconductor layer 311.

As a result, as illustrated in FIG. 30, widths of the energy wells W1, W2, W3, and W4 may be increased closer toward the boundary between the first n-type semiconductor layer 312 and the first p-type semiconductor layer 311.

However, the arrangement and shapes of the energy wells W1, W2, W3, and W4 are not limited thereto, and widths of the energy wells W1, W2, W3, and W4 may be increased further toward the boundary between the first n-type semiconductor layer 312 and the first p-type semiconductor layer 311.

When the light emitting device 300 is turned on, as illustrated in FIG. 31, electrons e− of a conduction band Ec and positive holes h+ of a valence band Ev may be respectively restricted by quantum wells formed in the conduction band Ec and the valence band Ev, and the electrons e− and the positive holes h+ restricted by the quantum wells may be easily recombined.

As a result, by the quantum well layer 312a, a recombination rate between the electrons e− and the positive holes h+ in the first n-type semiconductor layer 312 may be improved, and light generation efficiency of the light emitting device may be increased.

Since the quantum well layer 312a is provided at the first n-type semiconductor layer 312 at which light generation frequently occurs as described above, light generation efficiency of the light emitting device may be increased.

Although examples of the present disclosure have been illustrated and described above, the present disclosure is not limited to the examples described above and may be modified and practiced in various other ways by those of ordinary skill in the art to which the present disclosure pertains without departing from the gist of the claims below, and such modifications and practices cannot be understood separately from the present disclosure.

The invention claimed is:

1. An image forming apparatus comprising:
an exposer having a plurality of light emitting devices, a light emitting device among the plurality of light emitting devices to transmit light toward a photosensitive drum; and
a developer to develop an electrostatic latent image formed on a surface of the photosensitive drum by the light,
wherein
the light emitting device among the plurality of light emitting devices includes:
a light emitting layer to generate the light having a central wavelength variable to:
a first wavelength,
a second wavelength different from the first wavelength, and
a third wavelength different from the first wavelength and the second wavelength; and
a reflective layer to reflect at least a portion of the generated light, and
the reflective layer includes a plurality of sub-reflective layers, wherein the plurality of sub-reflective layers includes three sub-reflective layers respectively having:
a first thickness and a first refractive index at a first ratio corresponding to the first wavelength,
a second thickness and a second refractive index at a second ratio corresponding to the second wavelength, and
a third thickness and a third refractive index at a third ratio corresponding to the third wavelength.

2. The image forming apparatus of claim 1, wherein a sub-reflective layer of the plurality of sub-reflective layers is to reflect light ray having a wave length different from wavelengths of light rays to be reflected by other sub-reflective layers of the plurality of sub-reflective layers.

3. The image forming apparatus of claim 2, wherein:
the plurality of sub-reflective layers include low refractive index layers and high refractive index layers; and
refractive indices of the low refractive index layers are lower than refractive indices of the high refractive index layers.

4. The image forming apparatus of claim 3, wherein
a thickness of a low refractive index layer among the low refractive index layers included in the plurality of sub-reflective layers is different from a thickness of another low refractive index layer among the low refractive index layers, and/or
a refractive index of a low refractive index layer among the low refractive index layers included in the plurality of sub-reflective layers is different from a refractive index of another low refractive index layer among the low refractive index layers.

5. The image forming apparatus of claim 3, wherein
a thickness of a high refractive index layer among the high refractive index layers included in the plurality of sub-reflective layers is different from a thickness of another high refractive index layer among the high refractive index layers, and/or
a refractive index of a high refractive index layer among the high refractive index layers included in the plurality of sub-reflective layers is different from a refractive index of another high refractive index layer among the high refractive index layers.

6. The image forming apparatus of claim 3, wherein
a thickness of a low refractive index layer among the low refractive index layers included in the plurality of sub-reflective layers is different from a thickness of another low refractive index layer among the low refractive index layers, and
a thickness of a high refractive index layer among the high refractive index layers included in the plurality of sub-reflective layers is different from a thickness of another high refractive index layer among the high refractive index layers.

7. The image forming apparatus of claim 3, wherein
a refractive index of a low refractive index layer among the low refractive index layers included in the plurality of sub-reflective layers is different from a refractive index of another low refractive index layer among the low refractive index layers, and
a refractive index of a high refractive index layer among the high refractive index layers included in the plurality of sub-reflective layers is different from a refractive index of another high refractive index layer among the high refractive index layers.

8. The image forming apparatus of claim 3, wherein
the low refractive index layers are formed of aluminum-gallium-arsenic (AlGaAs) semiconductors having low refractive indices,
the high refractive index layers are formed of AlGaAs semiconductors having high refractive indices.

9. The image forming apparatus of claim 8, wherein
a thickness of an AlGaAs semiconductor among the AlGaAs semiconductors having the low refractive indices is different from a thickness of another AlGaAs semiconductor among the AlGaAs semiconductors having the low refractive indices, and/or
an Al-mixing percentage of an AlGaAs semiconductor among the AlGaAs semiconductors having the low refractive indices is different from an Al-mixing percentage of another AlGaAs semiconductor among the AlGaAs semiconductors having the low refractive indices.

10. The image forming apparatus of claim 8, wherein
a thickness of an AlGaAs semiconductor among the AlGaAs semiconductors having the high refractive indices is different from a thickness of another AlGaAs semiconductor among the AlGaAs semiconductors having the high refractive indices, and/or an Al-mixing percentage of an AlGaAs semiconductor among the AlGaAs semiconductors having the high refractive indices is different from an Al-mixing percentage of another AlGaAs semiconductor among the AlGaAs semiconductors having the high refractive indices.

11. The image forming apparatus of claim 8, wherein
a thickness of an AlGaAs semiconductor among the AlGaAs semiconductors having the low refractive indices is different from a thickness of another AlGaAs semiconductor among the AlGaAs semiconductors having the low refractive indices, and
a thickness of an AlGaAs semiconductor among the AlGaAs semiconductors having the high refractive indices is different from a thickness of another AlGaAs semiconductor among the AlGaAs semiconductors having the high refractive indices.

12. The image forming apparatus of claim 8, wherein
an Al-mixing percentage of an AlGaAs semiconductor among the AlGaAs semiconductors having the low refractive indices is different from an Al-mixing percentage of another AlGaAs semiconductor among the AlGaAs semiconductors having the low refractive indices, and
an Al-mixing percentage of an AlGaAs semiconductor among the AlGaAs semiconductors having the high refractive indices is different from an Al-mixing percentage of another AlGaAs semiconductor among the AlGaAs semiconductors having the high refractive indices.

13. The image forming apparatus of claim 1, wherein the reflective layer includes a first reflective layer including a plurality of first sub-reflective layers and a second reflective layer including a plurality of second sub-reflective layers.

14. The image forming apparatus of claim 13, wherein:
each of the plurality of first sub-reflective layers includes a first low refractive index layer and a first high refractive index layer; and
each of the plurality of second sub-reflective layers includes a second low refractive index layer and a second high refractive index layer.

15. The image forming apparatus of claim 14, wherein:
thicknesses and/or refractive indices of the first low refractive index layer and the second low refractive index layer are different from each other; and
thicknesses and/or refractive indices of the first high refractive index layer and the second high refractive index layer are different from each other.

16. The image forming apparatus of claim 1, wherein
a thickness of at least one sub-reflective layer among the plurality of sub-reflective layers is different from a thickness of another sub-reflective layer among the plurality of sub-reflective layers, and/or
a refractive index of at least one sub-reflective layer among the plurality of sub-reflective layers is different from a refractive index of another sub-reflective layer among the plurality of sub-reflective layers.

17. An exposer for an image forming apparatus, comprising:
a plurality of light emitting devices, a light emitting device among the plurality of light emitting devices to transmit light toward a photosensitive drum of an image forming apparatus,
wherein the light emitting device among the plurality of light emitting devices includes:
a light emitting layer to generate the light having a central wavelength variable to:
a first wavelength,
a second wavelength different from the first wavelength, and
a third wavelength different from the first wavelength and the second wavelength; and
a reflective layer to reflect at least a portion of the generated light, and
the reflective layer includes a plurality of sub-reflective layers, wherein the plurality of sub-reflective layers includes three sub-reflective layers respectively having:
a first thickness and a first refractive index at a first ratio corresponding to the first wavelength,
a second thickness and a second refractive index at a second ratio corresponding to the second wavelength, and
a third thickness and a third refractive index at a third ratio corresponding to the third wavelength.

18. The exposer of claim 17, wherein a sub-reflective layer of the plurality of sub-reflective layers is to reflect light ray having a wave length different from wavelengths of light rays to be reflected by other sub-reflective layers of the plurality of sub-reflective layers.

19. The exposer of claim 17, wherein:
the plurality of sub-reflective layers include low refractive index layers and high refractive index layers;
refractive indices of the low refractive index layers are lower than refractive indices of the high refractive index layers; and
a thickness of a low refractive index layer among the low refractive index layers included in the plurality of sub-reflective layers is different from a thickness of another low refractive index layer among the low refractive index layers.

20. The exposer of claim 19, wherein
a thickness of at least one sub-reflective layer among the plurality of sub-reflective layers is different from a thickness of another sub-reflective layer among the plurality of sub-reflective layers, and/or
a thickness of a high refractive index layer among the high refractive index layers included in the plurality of sub-reflective layers is different from a thickness of another high refractive index layer among the high refractive index layers.

* * * * *